(12) United States Patent
Hjelm et al.

(10) Patent No.: US 8,346,563 B1
(45) Date of Patent: Jan. 1, 2013

(54) SYSTEM AND METHODS FOR DELIVERING ADVANCED NATURAL LANGUAGE INTERACTION APPLICATIONS

(75) Inventors: David Hjelm, Bagarmossen (SE); Robert Krüger, Hamburg (DE); Björn Gülsdorff, Hamburg (DE); Ebba Birgitta Gustavii, Uppsala (SE); Maria Cheadle, Stockholm (SE)

(73) Assignee: Artificial Solutions Ltd., Stockholm (SE)

( * ) Notice: Subject to any disclaimer, the term of this patent is extended or adjusted under 35 U.S.C. 154(b) by 0 days.

(21) Appl. No.: 13/565,790

(22) Filed: Aug. 2, 2012

Related U.S. Application Data

(60) Provisional application No. 61/622,341, filed on Apr. 10, 2012.

(51) Int. Cl.
*G10L 15/00* (2006.01)
(52) U.S. Cl. ...... 704/275; 704/251; 704/257; 379/88.01
(58) Field of Classification Search ............... 704/251, 704/257, 275; 379/88.01
See application file for complete search history.

(56) References Cited

U.S. PATENT DOCUMENTS

| | | | | |
|---|---|---|---|---|
| 5,357,596 A | * | 10/1994 | Takebayashi et al. | 704/275 |
| 5,577,165 A | * | 11/1996 | Takebayashi et al. | 704/275 |
| 5,918,222 A | * | 6/1999 | Fukui et al. | 704/251 |
| 7,640,160 B2 | | 12/2009 | Di Cristo et al. | |
| 8,140,335 B2 | | 3/2012 | Kennewick et al. | |
| 2009/0070113 A1 | * | 3/2009 | Gupta et al. | 704/257 |

* cited by examiner

*Primary Examiner* — Daniel D Abebe
(74) *Attorney, Agent, or Firm* — Brian R. Galvin; Galvin Patent Law LLC

(57) ABSTRACT

A system for delivering advanced natural language interaction applications, comprising a dialog interface module, a natural language interaction engine, a solution data repository component operating comprising at least one domain model, at least one language model, and a plurality of flow elements and rules for managing interactions with users, and an interface software module. Upon receipt of a request from a user via a network, the dialog interface module preprocesses the request and transmits it to the natural language interaction engine. The natural language interaction engine interprets the request using a plurality of language recognition rules stored in the solution data repository, and based at least determined semantic meaning or user intent, the natural language interaction engine forms an appropriate response and delivers the response to the user via the dialog module, or takes an appropriate action based on the request.

3 Claims, 19 Drawing Sheets

SYSTEM AND METHODS FOR DELIVERING ADVANCED NATURAL LANGUAGE INTERACTION APPLICATIONS

CROSS-REFERENCE TO RELATED APPLICATIONS

This application claims priority to U.S. provisional patent application Ser. No. 61/622,341, titled "SYSTEM AND METHOD FOR PROVIDING A VIRTUAL ASSISTANT", filed on Apr. 10, 2012, the entire specification of which is incorporated hereby by reference.

BACKGROUND OF THE INVENTION

1. Field of the Invention

The invention relates to the field of artificial intelligence, and more particularly to the field of natural language interaction-based applications, such as virtual assistants.

2. Discussion of the State of the Art

Virtual assistants are an example of applications, referred to herein as natural language applications that interact through natural language (such as English, Swedish, Spanish, Chinese) with a human user. With respect to virtual assistants in particular, these applications perform functions similar to those provided by human assistants, in that they can engage in conversations with their users in order to perform functions similar to those provided by human assistants, including for example providing information, carrying out routine tasks, or performing other operations as required. Many virtual assistants have been used in association with web sites, with these virtual assistants often featuring the use of graphical images or avatars to simulate the experience of interacting with a human being.

While some natural language applications known in the art may possess rudimentary natural language understanding capabilities, in reality most such applications, and particularly most virtual assistants known in the art, are tightly scripted applications that carry out a limited range of activities. While scripted agents have proven useful in many online scenarios, their acceptance has generally been limited because, when users are restricted in their ways of expressing themselves in natural language, the communication language is not natural. Any notion of the virtual assistant's behaving like a real assistant disappears because too much effort is requested from the user when the user needs to know precisely what to say in order to achieve her goals. Thus there is a distinct need in the art for interpreting fluid and freely expressed natural language in various applications, for example by virtual assistants. This challenge is exacerbated by the fact that, even when equipped with rudimentary natural language interpretation, natural language applications such as virtual assistants that seem to only "know" a small number of facts and who only "talk about" a very limited range of subjects (such as appointment management) do not seem very realistic to humans, who are used to being able to say things in a fluid way, shifting subjects easily and intermixing casual banter with task-oriented speech.

The use of natural language applications generally, and virtual assistants more particularly, has also been hampered by the high degree of complexity and cost associated with developing and deploying virtual assistants, particularly those that have any significant degree of natural language interpretation capability. Because applications capable of even basic natural language interpretation tend to require teams of computational linguists to develop, the rate of adoption has been limited and the range of entities that have used virtual assistants tends to be limited to large companies that can afford the high time and cash investments needed to implement even marginal natural language applications.

Accordingly, what is needed in the art is a system and various methods that enable organizations of all sizes to efficiently deploy useful natural language applications such as virtual assistants that are able to interpret a wide range of natural language inputs from users, including casual off-topic conversational elements as well as task-oriented language.

SUMMARY OF THE INVENTION

Accordingly, the inventor has conceived and reduced to practice, in a preferred embodiment of the invention, various systems and methods for delivering advanced natural language interaction applications.

According to a preferred embodiment of the invention, a system for delivering advanced natural language interaction applications is disclosed. According to the embodiment, the system comprises a dialog interface module, a natural language interaction engine, a solution data repository component operating comprising at least one domain model, at least one language model, and a plurality of flow elements and rules for managing interactions with users, and an interface software module. Upon receipt of a request from a user via a network, the dialog interface module preprocesses the request and transmits it to the natural language interaction engine. The natural language interaction engine interprets the request using a plurality of language recognition rules stored in the solution data repository, and based at least determined semantic meaning or user intent, the natural language interaction engine forms an appropriate response and delivers the response to the user via the dialog module, or takes an appropriate automated action based o the request.

According to another preferred embodiment of the invention, a method for delivering advanced natural language interaction applications is disclosed. According to the embodiment, the method comprises the steps of: (a) receiving a request from a user at a dialog interface module; (b) preprocessing the request by the dialog interface module; (c) transmitting the request in text form to a natural language interpretation engine; (d) evaluating the request against a plurality of conditions until either a determination is made that additional input is needed from the user or not further conditions exist; (e) sending an appropriate response to the user or taking an appropriate action based at least on the results of step (d); and (f) awaiting a further user request or a session end event.

According to yet another preferred embodiment of the invention, an automated assistant operating on a computing device is disclosed. According to the embodiment, the system comprises a dialog interface module operating on the computing device and adapted for exchanging information with a user using one of a plurality of input and output means of the computing device, a natural language interaction engine coupled to the dialog interface module, for interpreting a received user request, a solution data repository component operating comprising at least one domain model, at least one language model, and a plurality of flow elements and rules for managing interactions with users, and an interface software module coupled to the natural language interaction engine and adapted to exchange data or commands with a plurality of external software services over a network. Upon receipt of a request from a user via an input means of the computing device, the dialog interface module preprocesses the request and transmits it to the natural language interaction engine. The natural language interaction engine interprets the request using a plurality of language recognition rules stored in the solution data repository, and based at least determined semantic meaning or user intent, the natural language interaction engine forms an appropriate response and delivers the response to the dialog module, which uses one or more output means of the computing device to provide a response to the user, or takes an appropriate automated action based on the request.

BRIEF DESCRIPTION OF THE DRAWING FIGURES

The accompanying drawings illustrate several embodiments of the invention, and together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
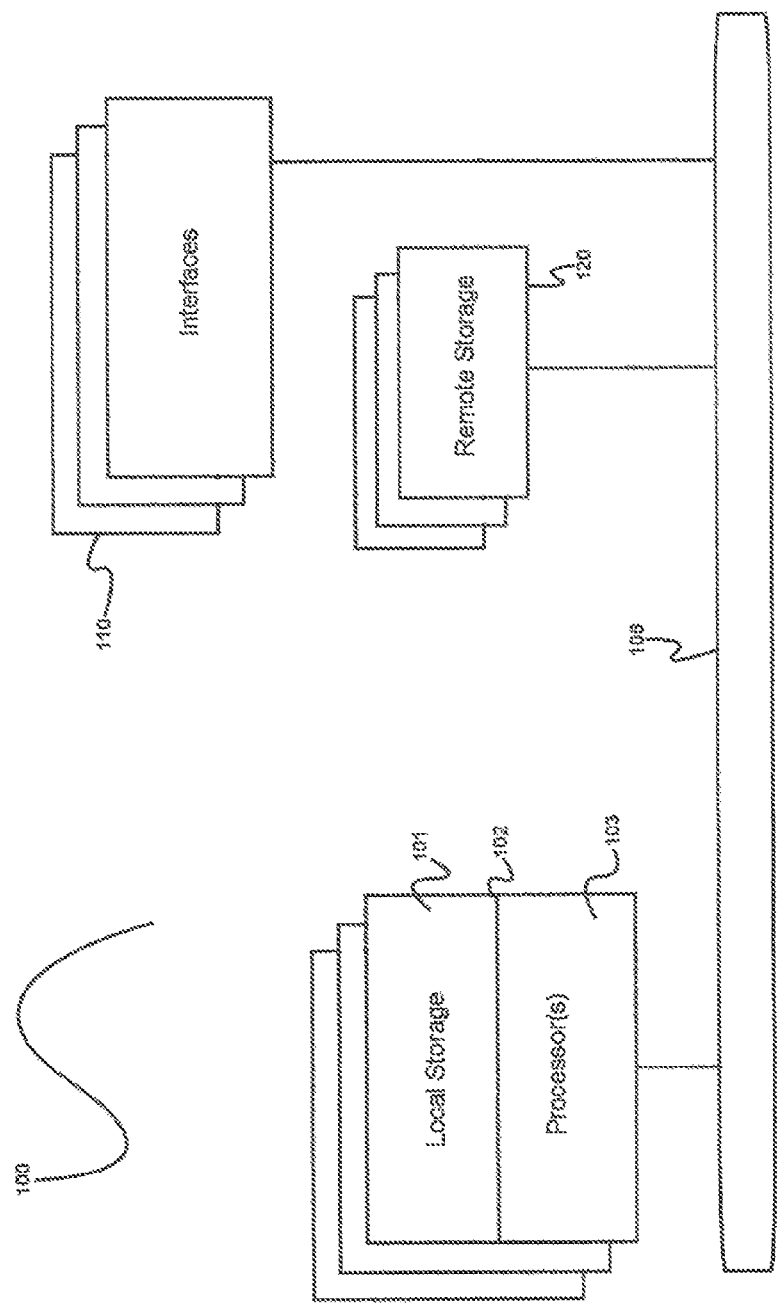
FIG. 1 is a block diagram illustrating an exemplary hardware architecture of a computing device used in an embodiment of the invention.

The inventor has conceived, and reduced to practice, various systems and methods for advanced natural language interaction by applications.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

As used herein, "virtual assistant" means a software, hardware, or hybrid hardware/software application that provides assistance to humans analogous to that provided by human assistants, generally using an intuitive user interface, such as one that allows a user to express her needs in natural language.

As used herein, "natural language interpretation" means interpretation, by a machine, of one or a series of utterances made by a human user speaking or writing naturally; in some cases "natural language" may be supplemented by gestural, haptic, or other input combined with natural language input (for example, saying "move this here" while pointing or clicking on an object and a later a location). That is, a "natural language interpreter" generally does not require users to format their requests in simple, fixed patterns (such as a program might be required to do, as for example when invoking a web service or an application programming interface (API)).

As used herein, a "dialog" is a conversational exchange between two or more participants consisting of a generally unstructured sequence of natural language contributions in the form of requests, responses, statements and the like. A dialog is an interaction sequence that actually occurs (i.e., in run-time) during a conversation exchange between a user and a natural language system.

As used herein, a "flow" is a logical task unit comprising a set of related interaction steps required (and preconfigured) in order to perform a task. Typically a flow may comprise one or more transition conditions and operative nodes. A flow is typically defined in a natural language system as a series of predefined steps to perform when some triggering condition is satisfied.

As used herein, an "instructional path" is a sequence of instructions from one or more flows that were invoked or executed during the delivery of a dialog by a natural language system. In effect, an instructional path is the realization of one or more flows that occurs in an actual conversation (or dialog) between a user and a natural language system; it represents the sequence of decisions (or instructions) taken in support of natural language conversation (whereas the corresponding dialog is the actual sequence of what was "said" during the conversation by the parties involved, rather than why it was said).

As used herein, a "natural language interaction system" or a "natural language system" is a computer-based system capable of interacting via dialogs with one or more users using natural language (perhaps augmented by haptics, gestures, or other nonverbal means). Natural language systems carry out their function using dialogs, which can be thought of also as the actual, as executed, sequence of interaction steps between a user and a natural language system. A natural language system may participate in a dialog, by following the instructional steps of flows.

As used herein, a "language object" means an abstract representation of a logical unit of human linguistic expression that has meaning and is suitable for processing by automated systems such as virtual assistants. Language objects, in their simplest form, are represented as sets of words that represent a plurality of variants of word forms or of a single common meaning, including inflectional variants and variants connected by synonymy. That is, generally a language object represents all variants and synonyms of a core word that represents it, and language objects may contain grammatical variants of words as well (such as verb tenses, contractions, and so forth).

As used herein, "script" means an executable sequence of instructions, generally stored (or at least rendered for execution) as plain text, which can be executed by an appropriate script interpreter. Scripts may be written in any scripting language known in the art, such as Perl, Python, PHP, Ruby, Groovy, and the like, or in any similar scripting language including proprietary scripting languages. As described variously herein, scripts generally are executed upon occurrence of specific events, such as initiation or termination of a user interaction session, or the triggering of a business rule such as "execute the following script if the number of active sessions exceed a configured number". Scripts can be nodes in flows (in which case they are referred to as "script nodes").

As used herein, "request" or "question" means a user-supplied or automatically supplied input to a natural language interaction-based system (as opposed to a system-supplied output).

As used herein, "response" means a system-supplied output from a natural language interaction system (as opposed to a user-supplied or automatically supplied input).

As used herein, "condition" means a rule or logical expression that, if satisfied, will allow for execution of one or more actions or will generate one or more effects. There are several types of conditions envisioned according to the invention, comprising for example: language recognition rules, skip conditions and transition conditions.

As used herein, a "language recognition rule" is a specific type of condition built up from language objects and used to parse or interpret a natural language expression.

As used herein, "trigger" or a "flow trigger" is a construct which holds a condition, and which makes the system activate and start executing a flow if the condition is fulfilled.

As used herein, "listener" is a rule construct with a conditional part and an operational part. When the conditional part is fulfilled, the operational part is invoked or executed, whereupon it updates current state based on information present in the current state and in the natural language input (the user request). Listeners may be configured to operate on a global level, on a flow level, or on a transition level, and they are generally evaluated in that order.

As used herein, "transition" or "transition condition" means a condition that determines whether the system should pass a transition to enter a new instructive step or process, a node (or a new transition). Transition may be input consuming (requires user input) or non-input consuming (does not require user input). Transitions may comprise one or more conditions and transitions can follow each other directly.

As used herein, "skip condition" means a condition that is verified prior to executing an instructive step (i.e., entering a node, for example of a flow). If the condition is met (e.g. some values have already been set previous in the system), the system will skip executing the instructional step and will continue as if it has already been executed.

As used herein, "small talk" means generally off-topic conversation elements or social dialog (such as greetings, acknowledgements, and the like), that may be used to respond to user request. For example, if, during a flow devoted to making an airline reservation, a user asks "do you like to fly yourself?" a preprogrammed response (or a random or other selection from a plurality of possible responses) may be invoked which causes a response such as "I never fly myself, because I live in a machine!".

As used herein, "safety net" means a special flow type which is invoked when a user request fails to satisfy any language recognition rule in any other flow (i.e., no matches were found); it is used to ensure that some form of response is made, after which generally the last active flow is resumed where it left off.

As used herein, "lemma" means a word form chosen to represent a substantially complete set of inflectional variants of a given word. A lemma is typically the canonical or dictionary head form of a word, e.g., the nominative singular for nouns or the infinitive for verbs. The inflectional variants may be seen as possible instances of the lemma, whereas the lemma itself is an abstraction.

As used herein, a "domain model" is an ontological, hierarchical model of a specific domain of knowledge, such as "financial services". Such a model comprises a plurality of concepts, which are typically represented as high-level language objects, and relationships between those concepts (for example, relationships such as genus and species, hypernymy and hyponymy, and so forth).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like). Moreover, in some embodiments one or more aspects, or all aspects, of the invention may optionally be implemented via a specially programmed chip (for instance, an application specific integrated circuit, or ASIC, or an erasable programmable read only memory, or EPROM), or via some other hardware-only approach known in the art.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
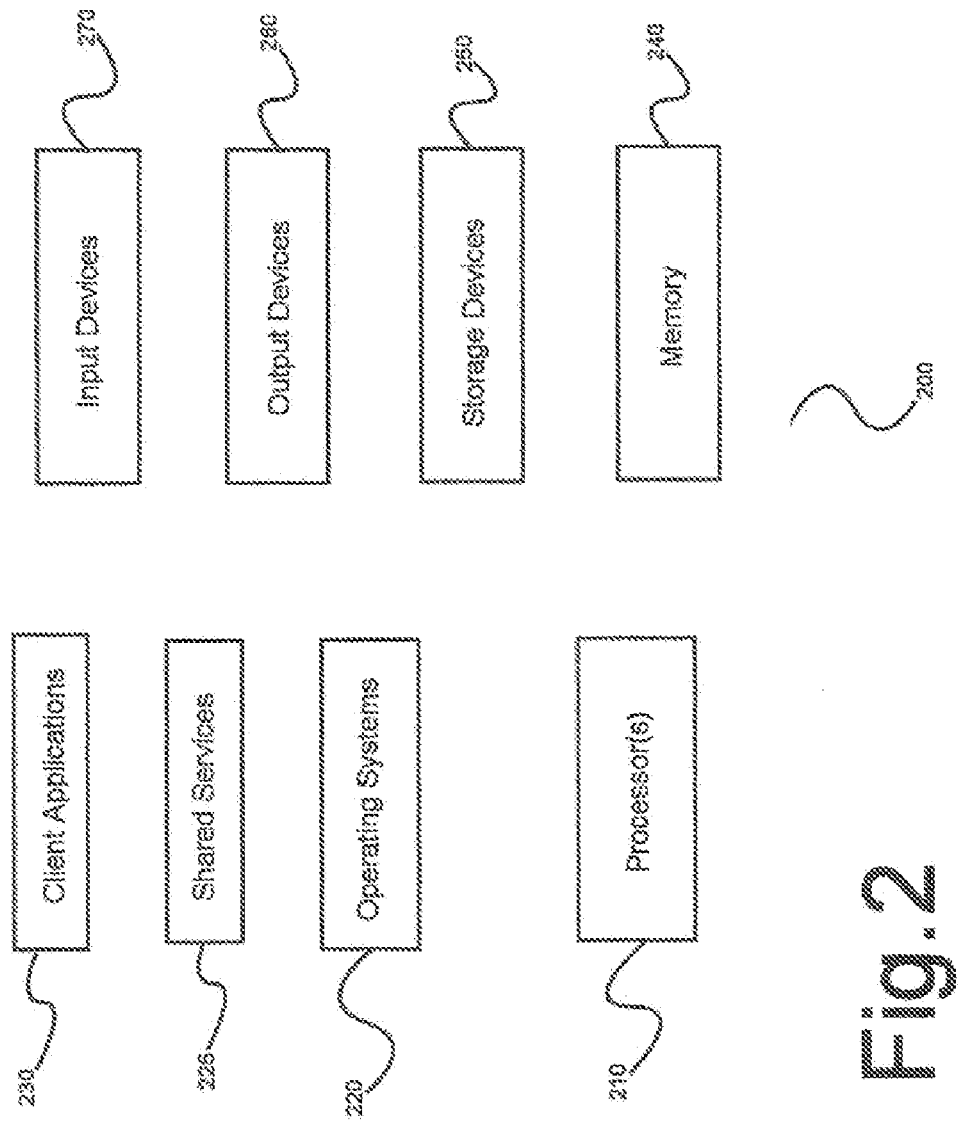
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
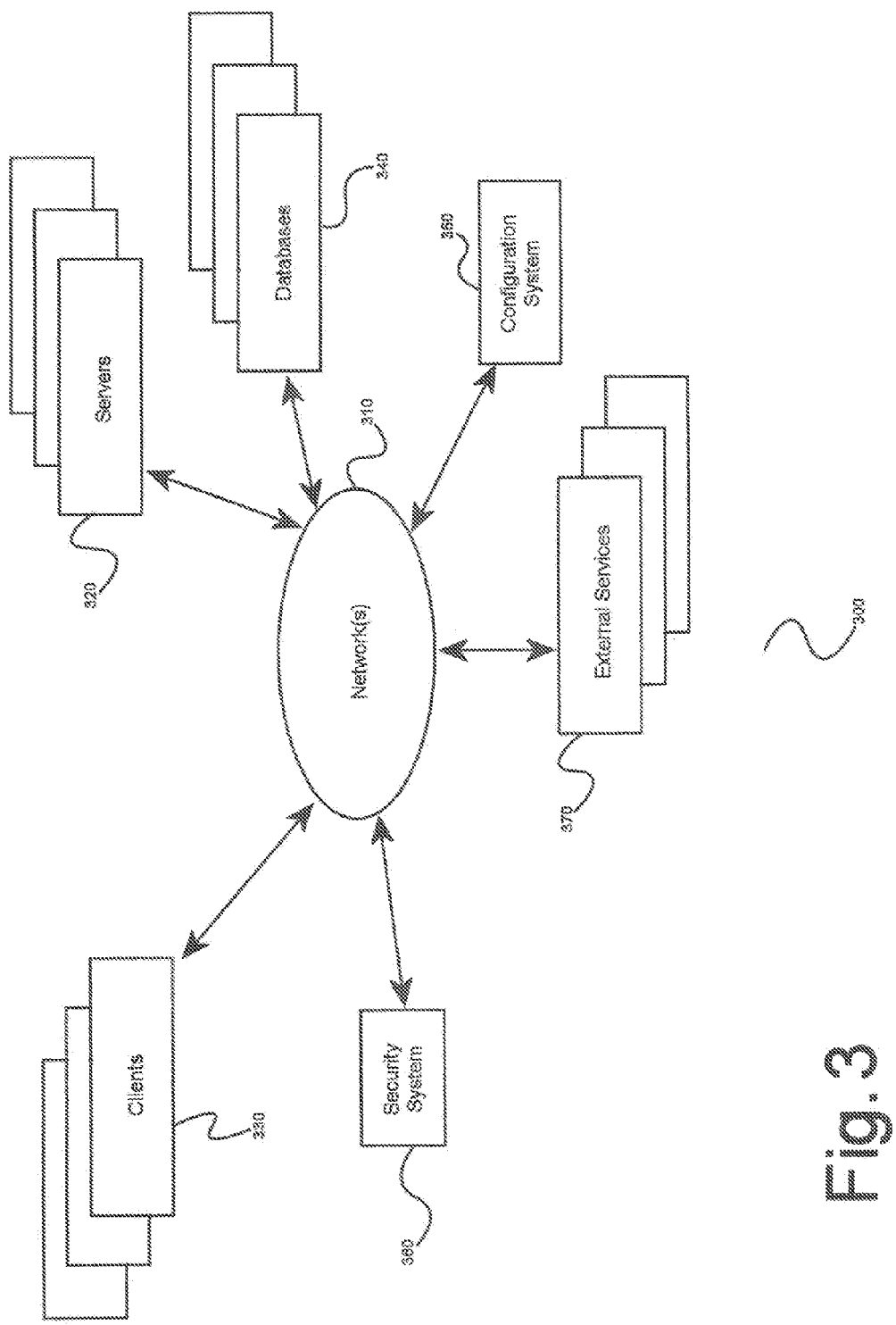
FIG. 3 is a block diagram illustrating an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Conceptual Architecture

Figure 4:
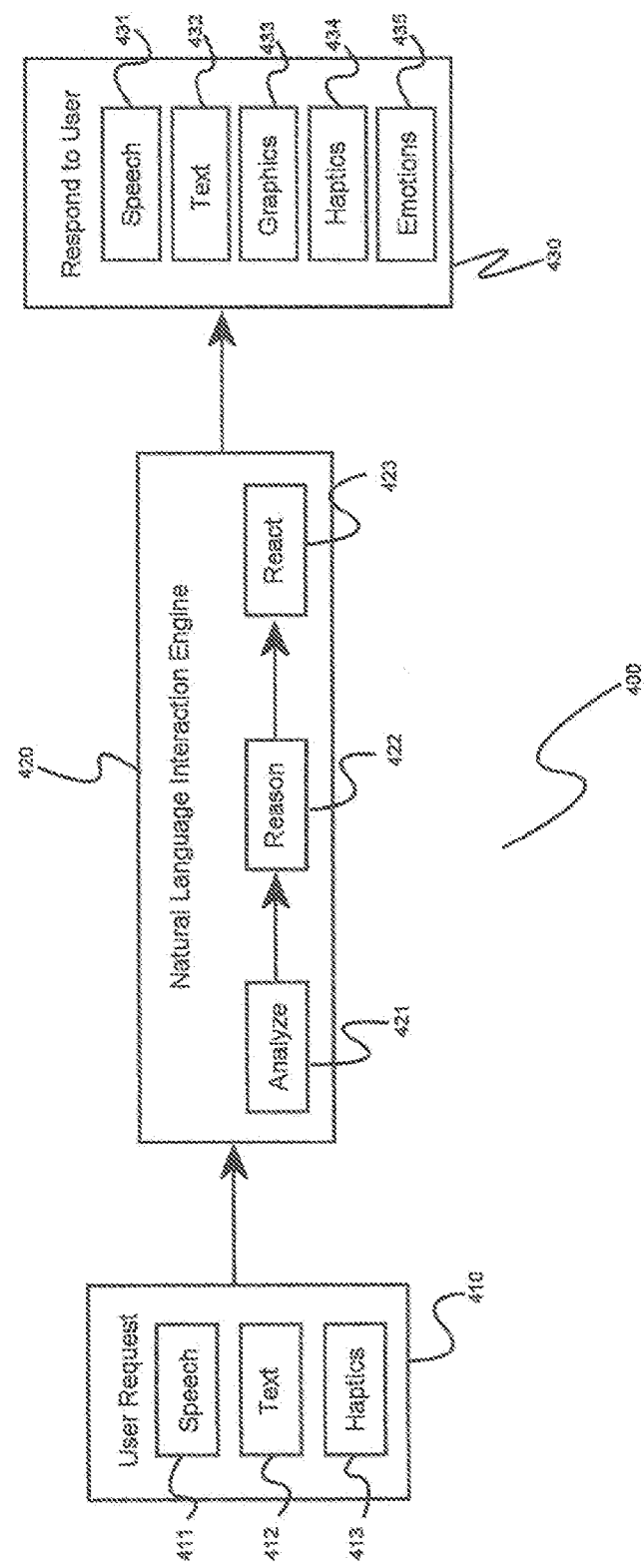
FIG. 4 is a block diagram providing a conceptual overview of a method by which human users may interact with a virtual assistant according to an embodiment of the invention

FIG. 4 is a block diagram providing a conceptual overview of a method 400 by which human users may interact with a natural language interaction application such as a virtual assistant according to an embodiment of the invention. According to the embodiment, user input or user request 410 is provided to a natural language interaction engine 420, which attempts to construct one or more appropriate responses to request 410 and provides any resulting responses 430 to user queries (or, analogously, responses or reactions to requests, for example when a virtual system does something as a result of being requested to do it, such as filling in a form or scheduling a meeting) using those constructed responses. Requests 410 to natural language interaction engine 420 may be made using any of a number of user interface means known in the art, including but not limited to use of text-based requests 412 (for instance, generated by typing a question or command into a text entry field in a user interface, such as on a mobile device application, on a web site, or in an email or other message), spoken requests 411 (for example, if a user speaks a command or a question into a microphone on a mobile device, the command or question then being converted into a more computer-usable form—typically but not necessarily a text string that comprises either a full transcription of the spoken command or request, or a standardized text element that is substantially semantically related to the spoken command or request), or even haptic or other user interface means 413 (for instance, taking actions such as pressing a button on a mobile device, or shaking or orienting a mobile device in a specific way, or similar actions). Similarly, in general responses 430 may be rendered as speech 431, text 432, graphics 433 (for example, a plurality of images to allow a user to review possible hotel choices), haptics 434 (for example, touch-sensitive or mechanical buttons, slide bars, selection interface elements that allow a user to select a region or a plurality of specific elements of a screen, and so forth), or emotions 435 (for example, an avatar adapted to dynamically display different emotions as appropriate for particular responses 430). Indeed, response 430 may take any appropriate form or combination of forms (for example, in a multi-modal interaction, a response might also be multimodal, comprising for example speech output and approximately simultaneous display of an appropriate image on a device screen). Responses may comprise a natural language response (including for example text-based output, spoken output), or a changes in one or more graphical user interface elements (for example, in response to a request, "Please tell me where I can eat near here", a list of selected restaurants might be displayed on a screen of a mobile device), or both, for example.

In order to formulate one or more appropriate responses to request 410, natural language interaction engine 420 carries out a process that can be broadly described as taking place in three steps. First, natural language interaction engine 420 analyzes 421 request 410 to determine its meaning (usually, by determining the user's intent). Analysis 421 may require preprocessing, for example to convert a spoken request 411 into a textual form suitable for further analysis (although it should be noted that, in some embodiments, audio data obtained from a spoken request 411 could be analyzed directly using one or more speech analytics technologies known in the art). Analysis 421 typically involves parsing request 410 and then analyzing its semantic content to determine one or more possible user intentions that motivated request 410. In many cases this may be straightforward (for instance, a request might be "Please set my alarm for 8 am", and accordingly the user's intent would easily be understood once the sentence was parsed), but in other cases it might be anything but straightforward (for instance, a user might say "Get out of here!" which has several possible intentions, depending on context). Thus it could be that output from analysis 421 could involve a certain amount of uncertainty, for instance in cases where an output of analysis step 421 comprises a list of possible user intents, perhaps with weights indicating their likelihood of being the user's actual intention.

Once analysis 421 is completed, natural language interaction engine 420 may undertake a reasoning step 422 to further elaborate or to better determine user intent. Interaction engine 420 may use advanced linguistic interpretation and business rules to simulate "intelligent thinking", allowing interaction engine 420 to appear to reason like a human and to determine a most appropriate way to respond to a user request 410. During this reasoning process 422, interaction engine 420 may take into account many contextual factors such as date, time, location of user, entities and facts discussed in a current or recent dialog, active flows, local context, global context, information picked up in previous dialogs, data about a user, and the like. In addition, inferences may be drawn based on data about one or more users (for example, when users do "this" they normally also want to do "that"). For example, if a user inquires about "next year's insurance premium", interaction engine 420 may understand context of "next year", but may need to seek clarification about whether the user is asking about home or motor insurance. In general, the goal of reasoning 422 is to reduce ambiguity about what a user meant in request 410, and to apply rules or other logical processing to take into account the extended context in which request 410 was made, in order to facilitate the final step of reacting 423. Once user intent is understood and relevant context has been taken into account, natural language interaction engine 420 may select and execute appropriate actions needed to react 423 to request 410. Suitable reactions may be to give an appropriate verbal, textual, visual, or haptic response, to ask for more information to disambiguate user intent (when for example disambiguation could not be carried out during reasoning step 422), to open a webpage, to play a video, to open another application, to automatically fill in a form, to invoke or update or interact with a third party service, to perform some form of multimodal output, or to execute a transaction for example by updating a database or by integrating with one or more backend or e-commerce systems. These three steps analyze 421, reason 422, and react 423 may all happen seamlessly in milliseconds with interaction engine 420 able to handle thousands of interactions simultaneously, or they may occur over an extended period of time, depending on context and the state of the device being used or its connectivity.

DETAILED DESCRIPTION OF EMBODIMENTS

Figure 5:
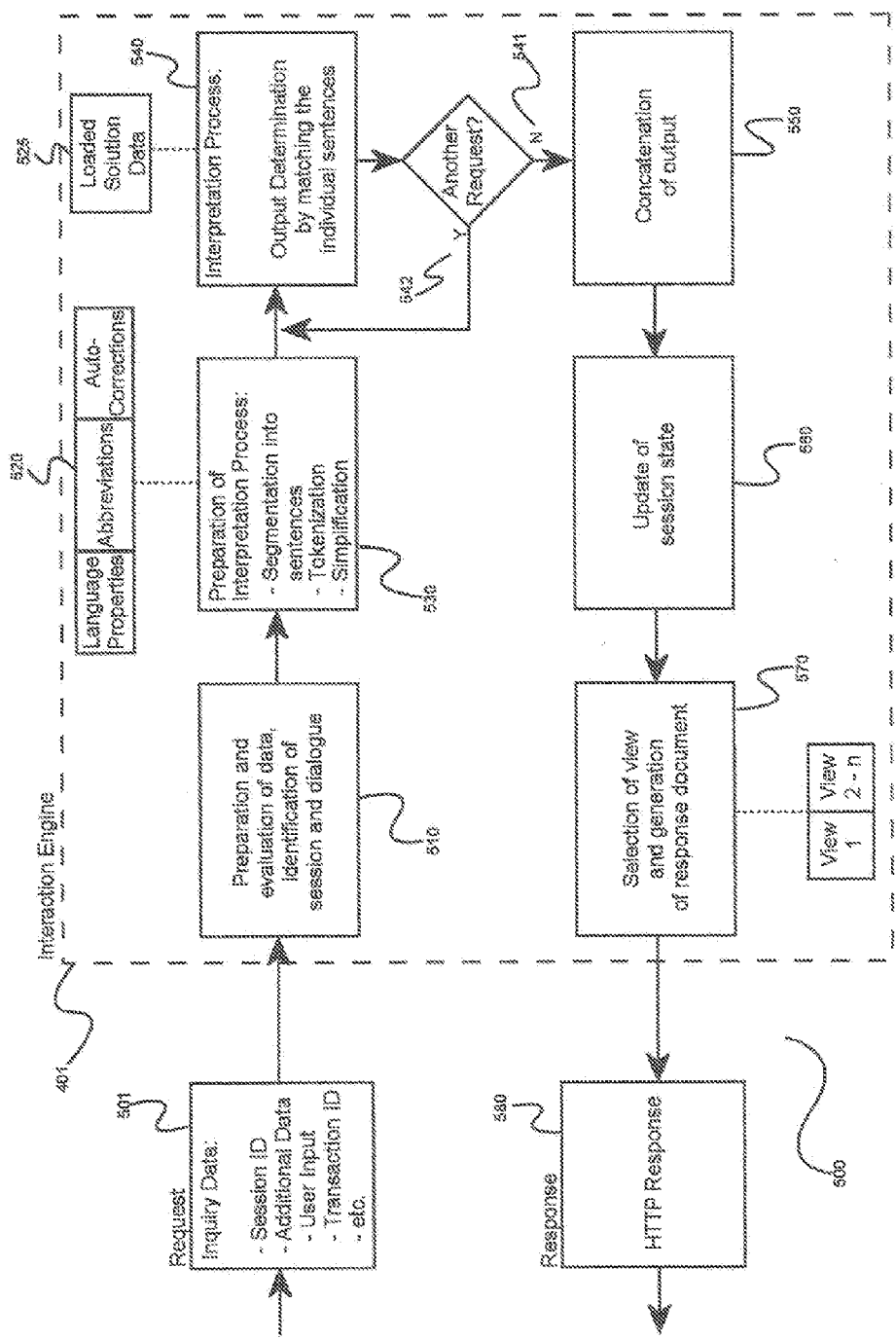
FIG. 5 is a high-level process diagram of a method for responding via a natural language interaction engine to user requests, according to a preferred embodiment of the invention.

FIG. 5 is a high-level process diagram of a method 500 for responding via a natural language interaction application (such as a virtual assistant) to user requests, according to a preferred embodiment of the invention. According to the embodiment, method 500 typically begins upon receipt of a request 501 from a user, the request 501 generally comprising a plurality of data elements such as a session identifier (typically but not necessarily a 32- or 64-bit unsigned integer) and additional request-specific data such as the actual user input provided, a transaction identifier, and any other relevant information. It should be appreciated by one having ordinary skill in the art that there are many types of request-specific data that might occur in different situations, any of which may be included in request 501 according to the invention. For example, in many cases device state data may be included in request 501, comprising data such as time of the request, physical location of a device associated with the request or of the user, a uniform resource locator (URL) corresponding to a web location from which the request was sent, and so forth. Moreover, it should be noted that, while method 500 may normally begin with the arrival of a user request 501, method 500 might also start in a number of other ways (not shown). For example, a timer or other computer-generated event may be intercepted by natural language interaction engine 420 that triggers a deferred request, represents a standard automated request, or in some other way acts in a fashion analogous to request 501, in that it signals a need for natural language interaction engine 420 to process the event and to formulate a response 580 which may be provided to a user. For instance, at a certain time a timer event might be triggered to alert a user that a scheduled calendar event is about to begin, and natural language interaction engine 420 may then formulate response 580 to notify the user in a natural way, such as by displaying or speaking a message such as, "Your meeting with Bob is scheduled to start in 10 minutes". Moreover, this simple example may even utilize advanced processing within engine 420; for example, engine 420 might take note of the facts that the scheduled meeting was supposed to occur in a specific conference room, and (based on device location data) that the user/recipient was not in a location from where it would be possible to attend the meeting in person. Engine 420 might, in such a case, instead formulate a more situationally relevant response 580 such as, "Your meeting with Bob is scheduled to be held in fifteen minutes in the Shasta Room, but it looks like you won't be able to make it. Shall I reschedule the meeting, or would you like me to contact Bob for you?" Thus whether in response to user requests 501 or some system-generated event or request, natural language interaction engine 420 may formulate an appropriate response 580 to present to its user; request 501 should be considered as exemplary of any appropriate triggering event that starts process 500.

Once a request 501 is received by interaction engine 420, in step 510 initial processing of request 501 takes place. Several possible initial processing substeps may be taken as needed, including for example (but not limited to) preparing data received in request 501 by transforming it into a form in which it can be used by further steps (for instance by transcribing spoken audio input into text form suitable for parsing), evaluating one or more data elements to determine whether there are any missing elements (and if so, attempting to retrieve those missing elements either from the author of request 501 or from a separate data source such as on-device data storage), checking to see whether the request 501 pertains to an existing interaction session (in which case its data is appended to that sessions' data store) or represents a new session (in which case new session identifier may be created, and a new session data store instantiated and populated with data from request 501), and so forth. In step 530, preparations are made to carry out an interpretation process, specifically by one or more of segmenting request 501 into sentences, tokenizing the resulting sentences (for example, by breaking them down into individual words, numerals, and other tokens), and simplification of the results by removing unnecessary words and optionally formatting the processed request into a format suitable for use in interpretation process 540. Step 530 is carried out using one or more of interpretation aids 520 such as language properties (characteristics of the language in which request 501 was rendered, such as standard sentence orders, verb tenses, and the like), standard or custom abbreviations (which may in some embodiments include domain-specific abbreviation sets, such as those used in making travel arrangements), and standard or customized auto-correction settings (or both).

Once request 501 has been preprocessed in steps 510 and 530, in step 540 an interpretation process is carried out to determine whether any queries, requests, rules, or other artifacts in one or more loaded knowledge bases 525 are satisfied (and if more than one satisfied rule is found, choosing an appropriate rule). Interpretation is typically done one (processed) sentence at a time, so following step 530 a check is made to see if another request exists (that is, whether was there more than one logical request or sentence in request 501); if yes 542, then interpretation process 530 may be repeated with the further request; if no 541 then execution passes to step 550. In step 550, outputs generated by interpretation process 530 are concatenated if necessary (for instance, if there were two or more logical requests in request 501), and then in step 560 session state variables may be updated. For example, as a result of a request 501, one or more steps in a flow may have been accomplished, so state variables such as "current flow state", "next flow step", and "flow history" might be updated. As another example, frequently more than one flow may be instantiated at a time within a given user interaction session, for example when a user may switch between related topics naturally and each topic is the subject of one or more flows; in such situations, one flow may be activated by a request 501 and a previously active flow might be put on a flow stack until it is reactivated by a subsequent request 501 or by completion of the newly activated flow. In step 570, one or more preconfigured views 575 is selected for rendering output to the user who submitted request 501 (or another user, for example in the case where a first user's request is to notify a second user of something; in this case, such a request 501 could be considered as two requests, one requiring notification of the second user of the thing requested, and the other being notification of the first user that the desired notification of the second user was carried out and possibly whether it was responded to or acknowledged by the second user). Views 575 may be graphical user input elements, or may be some other output modality such as spoken text. Once an appropriate view has been selected, one or more response documents is prepared and sent in step 580 as a response; responses are commonly (but not necessarily) rendered via hypertext transfer protocol (HTTP) or a secure version thereof, although other output protocols are known in the art may be used according to the invention.

Figure 6:
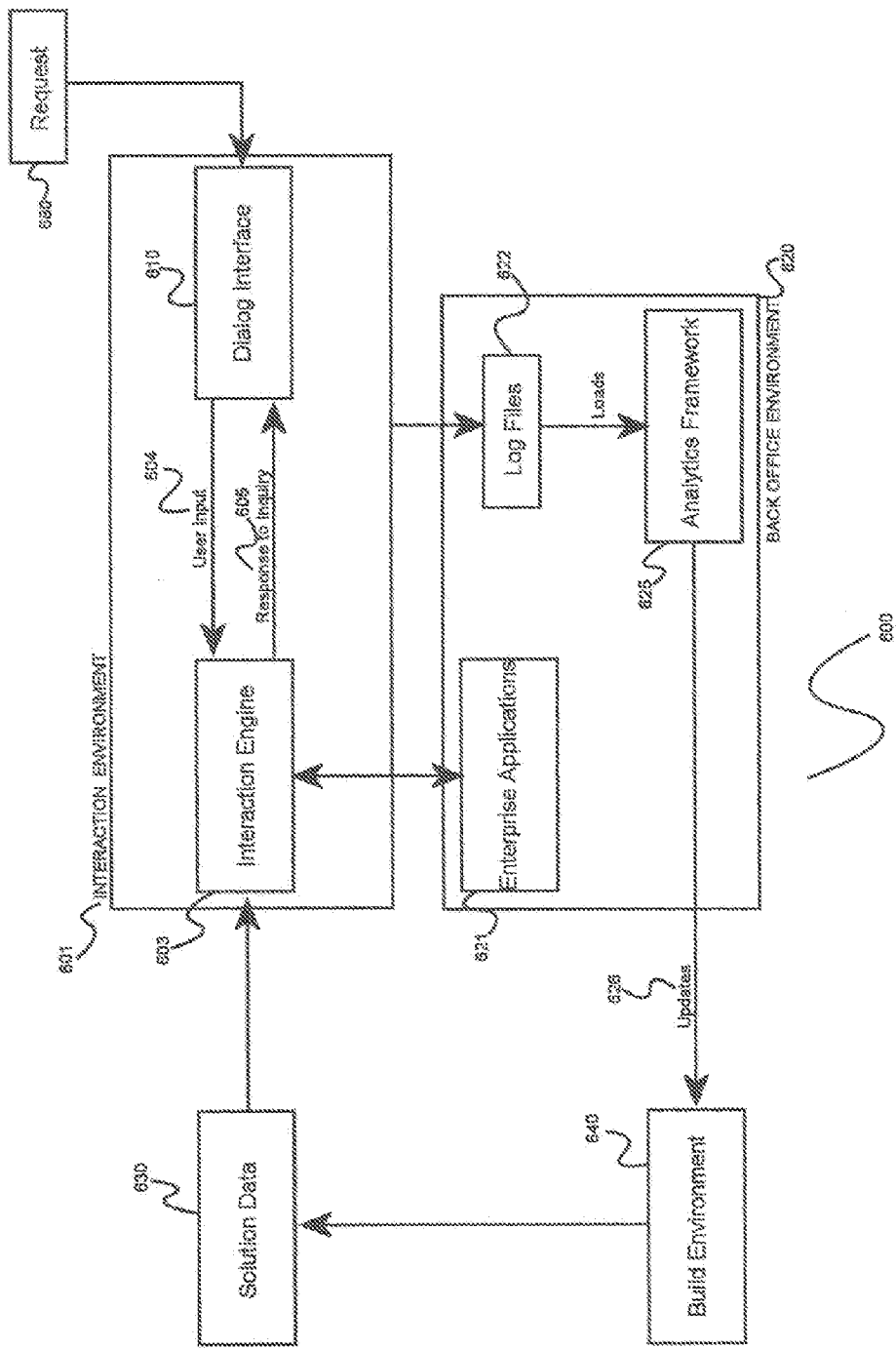
FIG. 6 is a high-level system architecture diagram of a preferred embodiment of the invention.

FIG. 6 is a block diagram illustrating a conceptual architecture of a system 400 for efficiently delivering natural language applications such as virtual assistants, according to a preferred embodiment of the invention. The embodiment shown in FIG. 6 may be implemented using any of the hardware architectures described above, or using a different type of hardware architecture.

For example, according to various embodiments, at least some systems for efficiently delivering natural language applications such as virtual assistants may be configured to use natural language interaction engine 420, a core component of a process 400 that manages conversations with users, creates responses from its own content base, and receives and sends data from and to external systems. Natural language applications according to the invention may understand or use free-format sentences, even when grammatical or spelling errors may be present. Virtual assistants or other natural language interaction applications according to the invention may allow for change of topic or task, interruptions, initiation of subtasks, or asking of counter-questions, and then may return to a previous topic or resume a task within a conversation either on request by the user or initiated itself. Natural language applications may be able to handle jargon, specialized corporate vocabulary, idioms, and slang. For example, a customer may ask their questions in a conversational style without having to go through a series of yes/no queries or standardized prompts and questions. A natural language application might not provide the same response to a given request or question when provided twice, as it may for example select a context-dependent answer to a question (e.g., a different response dependent on the time of the day), and may handle deferred requests easily.

When a user submits a request 680, it is generally handled by a dialog interface module 610 within interaction engine 601. Dialog interface module 610 may preprocess request 680 by various means, for instance by converting a spoken request 680 into a textual or other form suitable for interpretation by natural language interaction engine 603. Dialog interface module 610 may also, in some embodiments, process or provide one or more emotional or other attributes received with or about request 680; for example, a text-based request 680 may be accompanied by one or more metadata elements that specify emotional context, or other attributes not present in the actual text of request 680, so that such attributes may be considered by natural language interaction engine 603 when interpreting request 680. Natural language interaction engine 603 manages execution and state of one or more flows, and manages transitions between flows as required by subsequent requests 680 (for example, when a user changes topics). Natural language interaction engine 603 uses a process 500 such as that described at a high level with respect to FIG. 5 to carry out an interpretation process such as that briefly described above using language recognition rules from one or more solution data repositories 630 built up from one or more language objects, flows, language recognition rules, and the like. Interpretation may be carried out by natural language interaction engine to determine one or more semantic meanings or user intents associated with a request 680. When a language recognition rule has been triggered, and natural language interaction engine 603 has taken any appropriate actions and possibly found one or more responses 605, these are sent back to dialog interface module 610, which then updates session state and provides a response 605 to the user in an appropriate medium, channel, or mode (or multi-modally), as described herein. Natural language interaction engine 603 may commonly be integrated and interact with a back office environment 620, which may for example comprise one or more enterprise (or third party) applications 621, log files 622, and analytics frameworks 625. Enterprise applications 621 may, for example, be a customer relationship management (CRM) system, a corporate transaction database, a trouble ticket tracking system, or any other type of enterprise applications 621 known in the art. Connections between interaction engine 601 and enterprise applications 621 may be any of a number of interface means known in the art, including but not limited to web services invocations, proprietary application programming interfaces (APIs), Java remote procedure calls, and so forth. Log files 622 may be written directly to a file system, or may be processed by a log server (not shown) which collects information from interaction engine 601 and processes it (for instance by parsing raw data and compressing it into a more efficient format for storage), and may then either write log files directly to disk or add log entries in a relational database or other data storage system. As logs are loaded, either periodically, continuously, or on demand, they may be loaded into analytics framework 625, where either automated or manual analysis (or both) may be conducted. Analysis may be performed, for example, in order to identify common dialog models (that is, sequences of dialog steps or flows that occur often in interactions between humans and virtual assistants) or dialog flows that tend to result in abandonment or in user's seeking help or expressing frustration with a virtual assistant; such analytical results may be helpful in improving one or more virtual assistants by identifying best and worst practices in virtual assistant dialog or flow designs, and by identifying problems with language or domain models contained in solution data repository 630. When such useful lessons are learned, they may be passed via periodic or occasional updates 626 to build environment 640, where they can be used by human natural language interface (NLI) developers to improve an existing natural language application (such as a virtual assistant). In some embodiments, modifications to data stored in solution data repository 630 may be made automatically as a result of patterns or defects detected by analytics framework 625 (for example, if it was determined that a certain node in a flow was always abandoned because the applicable language model had an error).

In general, natural language interaction engine 601 (which for brevity may also be referred to simply as "interaction engine" 601) makes use of one or more solution data repositories 630. Solution data repository 630 will be described in detail below, but in general comprises one or more collections of language objects and ontologies or domain models relevant to a particular natural language application or "solution". Solution data repositories 630 are generally prepared in a build environment 640, although in many embodiments pre-built solution data repositories may be supplemented (using build environment 640) by addition of organization-specific or domain-specific data. For example, in preparing a "travel agent" virtual assistant using build environment 640, specific language objects (phrases, vocabularies, and so forth) may be added that are likely to be relevant in travel-related dialogs, and a domain model or ontology of one or more domains and/or subdomains related to travel and to likely adjacent subject matter domains (for example, credit card handling) may be created (or imported and edited). A knowledge base of solution data 630 is a collection of language recognition rules, conditions, flows, language objects, ontologies, scripts, or domain models.

A virtual assistant request 680 may be generated, as discussed in the previous paragraph, either by being spoken in various forms, being provided as text in various forms, being provided by haptics (clicking, pointing, gesturing, and the like), or by any combination of these. A dialog interface module 610, which may be comprised as voice and, or text processing applications, turns a user input 604 into a request form that natural language interaction engine 603 may "understand". Natural language interaction engine 603 may prepare, evaluate, interpret and identify a dialog session, use enterprise and third party applications 661 (from a back office environment 620) as deemed valuable to process; then apply segmentation and tokenization processes to break a user input into its constituent elements, which are then passed to a parsing and interpretation process, then may generate an appropriate response or perform an appropriate action 605, and send it back through a dialog interface module 610 and on back to requestor 680.

As dialogs take place, logging activity 621 within a back office environment 620 captures data pertaining to one or more session events, which allows dialogs to be analyzed by an analysis framework 650 at a later time, which may provide insights into customer behavior and for possible quality and very specific structural metrics as desired.

Analysis framework 650 may publish metrics and specific dialog criteria as captured by logging and analysis, sending criteria on to a build environment 640 for possible updating and inclusion into learning for new requests. Build environment 640 may contain a large array of knowledge divided into items such as language and domain libraries, previously captured knowledge and, using coding and testing tools, create dialogs for a variety of request types. Additional knowledge tools helpful to development process may contain rules for responding, various object types for a variety of requests, and information from similar request development activities, and may be available for natural language interaction engine 603 as a request session develops.

Figure 7:
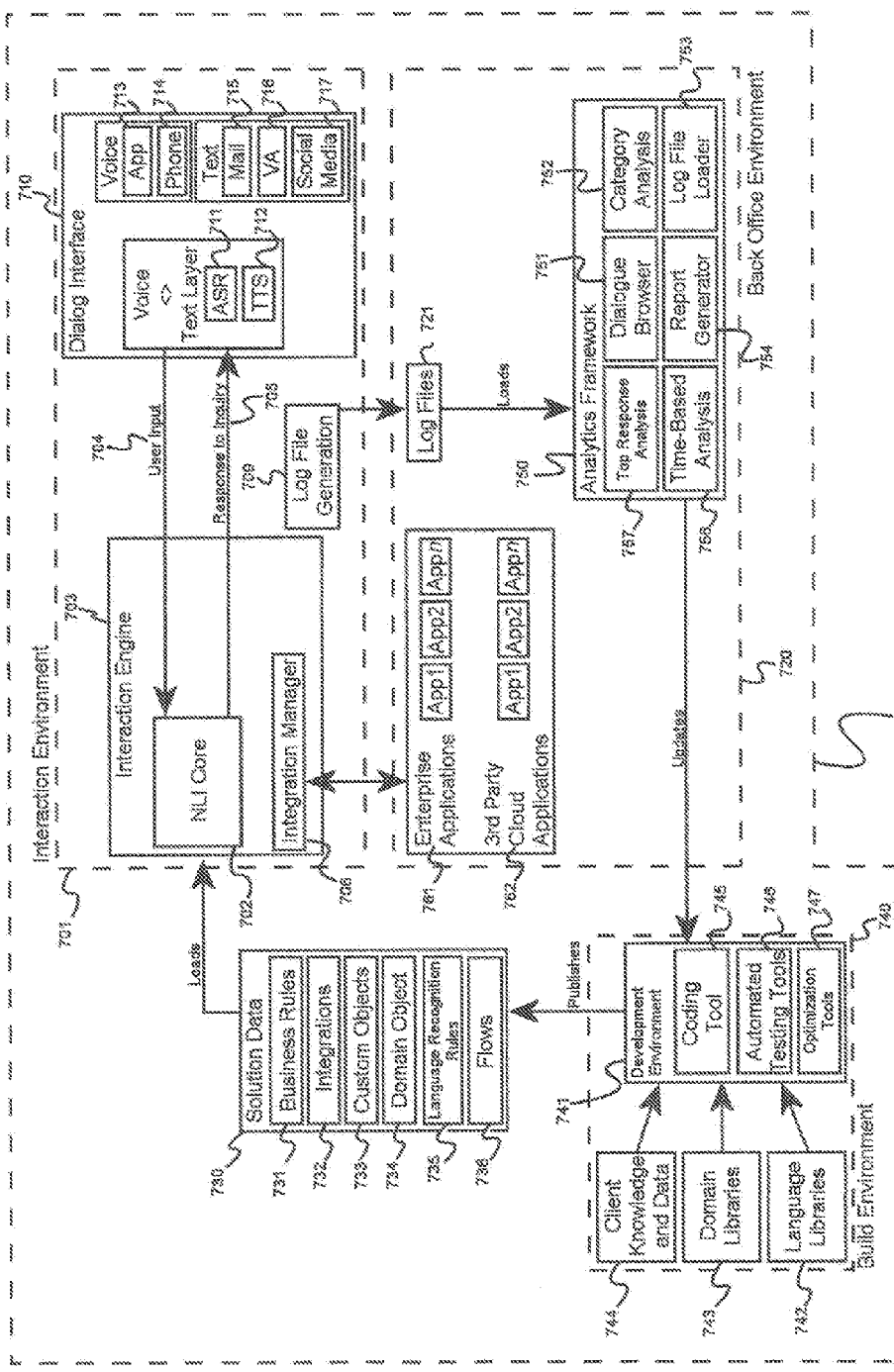
FIG. 7 is a detailed architecture diagram of a preferred embodiment of the invention.

FIG. 7 is a block diagram illustrating an exemplary arrangement of components of a system 700 for efficiently delivering natural language applications according to an embodiment of the invention, showing more detail regarding the high-level conceptual architecture shown in FIG. 6. As indicated above, key elements of system 700 typically comprise a natural language interaction environment 701, one or more solution data repositories 730, a build environment 740, and a back office environment 720. Each of these may in turn be comprised of several components, in varying combinations, as will be described in detail herein.

Interaction environment 701 normally comprises a dialog interface 710 and an interaction processing core engine 703. Dialog interface 710 performs functions necessary for media-specific interactions with users. A principal role of dialog interface 710 is to receive input from a user in order that interaction engine core 703 can successfully determine a user's meaning (and the user's intent), and to provide feedback or responses back to the user. For example, when interactions are conducted using speech interfaces, interaction may be either via a phone 714 (for example when a virtual assistant is used in place of a conventional IVR application) or via a dedicated voice application 713 (for example when a user of a mobile application or a web site interacts with a virtual assistant using an application, and no phone is involved). In either case (or indeed in other cases, such as embodiments where other means of exchanging voice communications via audio signals—of which many are known in the art—are used, such as interaction with a building control virtual assistant using an intercom system), it is generally necessary to convert speech input into some for of text, and conversely to convert text output into some form of speech output (although, it should be noted, there are limited means known in the art for analyzing speech signals directly—known in the art as speech analytics technologies—and these could be used directly to infer user meaning and intent). Normally this is done by a voice-to-text conversion layer within dialog interface 710, comprising an automated speech recognition (ASR) engine 711 and a text-to-speech (TTS) engine 712. Many of each of these components are well known in the art, such as those available from Nuance™, Acapela™ and other vendors; any suitable ASR and TTS engines may be used according to the invention. In some embodiments, ASR 711 and/or TTS 712 are deployed integrally to system 700 (as shown in FIG. 7), while in others they may be deployed as separate services delivered over a network such as the Internet or a telecommunications network; such external services architectures may employ ASR 711 or TTS 712 provided by one or more third party service providers. Input may also be received (and output sent) via text-based media channels such as 715, dedicated virtual assistant interfaces 716 (for instance, when a virtual assistant equipped with a graphical avatar is embedded in a web site and, when activated by a user, is interacted with directly), a social media interface 717 such as Facebook™, LinkedIn™, Twitter™, and the like, or any of a number of other text-based media channels known in the art but not shown in FIG. 7 (such as, for example, text-based interaction with a virtual assistant from within a document such as a word processing document, a spreadsheet document, or a presentation document; kiosks such as at airport check-in counters, and so forth).

Once input has been received, it is passed as input 704 to interaction engine core 703, where it is reacted to and one or more responses 705 may be generated. When responses 705 are generated and sent to dialog interface 710, they are converted (using TTS 712) to speech form or spoken output, if required, and delivered to a user via either or both of a voice application 713 or a phone 714, or if response 705 is already in textual form it is passed directly to a text-based output channel such as email 715, virtual assistant 716, social media 716, and the like. As a further example illustrating how natural language interpretation can be used to enrich multimodal user interactions, consider a combination mobile phone application that proceeds as follows. First, a user presses a button to initiate the application, which displays or plays a welcome prompt (or both) to the user. The user may say an utterance expressing her intent or goal (for example, "I would like to arrange travel to Berlin tomorrow morning.") The application may then display a selection of radio-button style choices on the screen of the mobile phone, for example comprising "Flights", "Hotel", "Car/Transport", and "Recommended". At substantially the same time, the application may speak a phrase such as, "Where would you like to start to make travel plans? Select a button or tell me what you want to do." The user and the application may, throughout the subsequent interaction, use a blend of spoken, text, and haptic interface conventions to exchange information and satisfy the user's original (and any subsequently arising) intention). Thus it can be seen that many examples of natural language interaction applications envisioned by the inventors may involve multimodal interactions comprising two or more interface modalities (such as speech, text, buttons, images, videos, vibrations, sounds, and so forth).

When input 704 is received by natural language interaction engine 703, it is handled by a natural language interaction core (NLI core) process 702, in order to determine one or more meanings of a user's input 704 and to infer therefrom the user's intent. Once a user's intent is understood (or a determination is made that understanding of intent is not possible), NLI core 702 carries out flow processing, dialog management, and output generation processes as described in more detail below in order to formulate one or more appropriate responses to input 704. Once a plurality of responses are identified, NLI core 702 passes responses 705 to dialog interface 710, which prepares them and renders them to the requesting user in an appropriate form and via an appropriate delivery channel (speech, email, IM, chat, virtual assistant bot, etc.). In general, every time input interpretation module 707 receives and processes a user input 704, and every time output generation module 708 formulates a response 705 and sends it to dialog interface 710, log file generation module 709 generates one or more log files 721 in order to capture a history of interactions between users and natural language applications. In addition, more or less detailed information pertaining to processes carried out by NLI core 702 is passed to log file generation module 709 as well, in order that not only what transpired is recorded (that is, the inputs 704 and outputs 705), but also how it was done and why (that is, a history of decisions made, rules executed, and so forth in NLI core 702 is captured). NLI core 702 may, in order to process user inputs or to create responses, require access to one or more external data sources or external services; such access is provided by one or more connection APIs of interface software module or integration manager 706, which manage interactions between NLI core 702 and external data sources and services. Such external entities may comprise a plurality of enterprise applications 761 such as customer relationship management (CRM) systems, transaction management systems, trouble ticket tracking systems, inventory management systems, and so forth (it will be appreciated by one having ordinary skill in the art that essentially any enterprise or third party applications may be interacted with using standards-based APIs or other integration technologies, and thus any such enterprise applications known in the art may be used by interaction environment 701 as needed to serve users). Such external entities may also comprise a plurality of third-party cloud-based applications 762, or any other third party services or applications accessible via public or private interfaces (whether standards-based or proprietary), subject only to findability and security constraints.

NLI core 702, when processing requests received from dialog manager 710, uses one or more solution data repositories (or simply "solutions") 730 that it loads as required. Solutions 730 generally comprise various combinations of business rules 731, integrations 732 (that is, configuration data necessary to carry out communications via connect APIs of interface software module 706 with enterprise applications 761, third party cloud applications 762, and the like), custom objects 733 (such as script objects used to encapsulate frequently used functionality), domain objects 734 (which are collections of ontologies or ontological data sets that represent knowledge about one or more subject domains such as travel, finance, heart health, furniture, and so forth), language recognition rules 735 built up from language objects (which may comprise a large number of formal models of various language elements for one or more languages; language objects will be discussed in detail below), scripts (executable code and data units which may be invoked within language recognition rules), and flows 736. These solution data 730 components in turn may be preloaded as standardized knowledge bases when a natural language application is created, or they may be hand-crafted by one or more natural language interaction (NLI) developer within build environment 740 (or both; it is quite common to start with a prebuilt set of knowledge base 730 components, and then to add new components or extend the added components from within build environment 740).

Build environment 740 comprises several components, organized in a preferred embodiment into a single application 741 (sometimes referred to as a "studio"), from which an NLI developer may access client knowledge and data 744, domain libraries 743, and language libraries 742. Build environment 741 typically comprises a graphical coding tool 745 and one or more automated testing tools 746. Thus, in a typical scenario, a developer building a new natural language interaction application such as a virtual assistant would, within a coding tool 745 in build environment 741, load one or more prebuilt language libraries 742 and domain libraries 743, edit these based on available client knowledge and data 744, and then test the resulting knowledge base 730 using one or more automated (or manual) testing tools 746 in order to test the behavior of her new application prior to its use. Once satisfied with a new solution 730 (and with the associated application's behavior), the developer would publish knowledge base 730, which would then be available for NLI core 702 to load and use in handling user requests 704. A key benefit of the build environment 740 approach envisioned by the inventors is that it enables NLI developers who are not necessarily research scientists (such as computational linguists) to rapidly prototype, test, refine, and then tune natural language applications for particular domains or business needs. This makes it possible to move natural language application development from being an activity typical of university research labs to one practiced commonly by mainstream application developers and users such as businesses (large and small) and other organizations desiring to use natural language applications in production.

According to a preferred embodiment of the invention, the process just described is part of an overall closed-loop process. The loop is made "closed" by the availability of an analytics framework 750, which can be used to automatically or manually analyze natural language application performance in order to eliminate poorly functioning dialog elements, improve customer satisfaction, and so forth. Analytics framework 750 generally takes as input a plurality of log files 721 generated by log file generation module 709, although in some embodiments analytics framework 750 may take input directly in real time from interaction engine 710, for example by receiving requests 704, responses 705, raw user inputs, and processed outputs to users as they occur directly from the corresponding components of interaction engine 710 (and of course diagnostic information about decision-making and operational processes occurring within interaction engine 710 could similarly be obtained as they occur). Thus the log file-driven architecture shown and discussed herein should be taken as exemplary and not limiting. In various embodiments, analytics framework may comprise one or more of a top response analysis module 757, a dialog browser 751, a category analysis module 752, a log file loader 753, a report generator 754, and a time-based analytics module 756. In any particular embodiment of the invention, some, most, or all of these components may be present within analytics framework 750; moreover, in some embodiments one or more of these components (or other analytical components known in the art such as business intelligence engines, datamarts, and the like), may be implemented as standalone components separate from analytics framework, including for example delivery as web-based or cloud-based services from a third party analytics platform provider. It should be apparent to one having ordinary skill in the art that any combination or architecture of these and other analytical components may be used according to the invention, and that the particular arrangement shown in FIG. 7 is intended to be exemplary and not limiting.

Top response analytics module 757 is a software module that computes a ranked list of responses 705 generated by interaction engine 710 to user requests 704; in many embodiments, a corresponding ranked list of requests 704 that led to a particular response 705 may be provided (often by provision of a "drill-down" capability, so that when viewing a ranked list of responses 705, a user may right-click or take some other action to see what requests 704 led to that response 705 most commonly). Responses 705 (and corresponding requests 704) may be ranked according to one of many numerical or qualitative parameters, such as most popular, most used, most often abandoned from, most often viewed, most often complained about, or any other similar ranking metric. Top response analytics module 757 may automatically generate and maintain ranked lists of responses 705, or may do so on request from an analyst or other authorized user (or both). In some embodiments, users may be allowed to specify one or more custom ranking criteria (as long as they are susceptible of measurement based on data received from interaction engine 710); such custom rankings may be conducted on an ad hoc basis, although useful rankings may be added to the last of available standard rankings, and could be added to any automated ranking processes as well, if desired.

Dialog browser 751 is a user interface element that allows an analyst or other authorized user to view (or hear) one or more interactions or dialogs between users and natural language applications. Users may be allowed to request random interaction sessions, in which case one or more sessions would be displayed for viewing at a time; such a view would be useful for example to a marketing analyst who wants to "see" how users interact by randomly browsing among user experiences. Users may also select one or more sessions for viewing (or listening), based typically on any of a wide range of filters or selection criteria made available through a user interface of dialog browser 751. For example, a user could request to view all interactions with a specific user, or with a specific user/application pair, or relating to a particular subject such as a particular product, and so forth. Users may also request a specific interaction by providing a time, or a session identifier, or a customer name and a time, or any other filtering arrangement that can distinguish the desired session from all others.

Category analysis module 752 is typically a graphical user interface component that allows an analyst or other authorized user to view one or more, or all, sessions or interactions that pertain to a particular category (such as a category within a domain model, for instance by requesting to view a sampling of sessions involving furniture-related questions). Users of category analysis module 752 may be able, for example, to view all or a set of sessions (or to view aggregated numerical data pertaining to such sessions) that were about home equity loans. While viewing such a set of data or sessions, the user might be able to explore for example whether certain questions related to home equity loans are more commonly received from customers that are actually considering taking out such a loan; this might be determined, for example, by displaying columns of data about "probability of loan application being taken" and "probability of closing of loan applications taken", and allowing a user to rank sessions by one or another column in order to understand such patterns. It should be clear to one having ordinary skill in the art of data analytics that there are many ways of viewing and analyzing data of this type, any of which may be included in category analysis module 752 according to the invention.

Time-based analysis module 756 is typically a graphical user interface element that allows an analyst or other authorized user to configure, conduct, schedule, and view the results of various analyses of one or more time-based behaviors of natural language applications and/or their users. For example, time-based analysis module 756 may in some embodiments be used to identify trends in user behavior, such as the emergence of new dominant questions or shifts in linguistic usage over time. Another example, likely to occur quite readily, would be the use of time-based analysis module 756 to study assimilation of new application capabilities upon their introduction in one or more natural language applications. When new capabilities (for instance, new language models, improved business rules, richer interaction modality options, or expansion of domain coverage) are added to an application such as a virtual assistant, their use by those who interact with the modified natural language application is likely to vary over time as more and more users become accustomed to the new capabilities; such user assimilation can be studied to learn how long to wait before expecting changes in user behavior (such knowledge would be quite useful in avoiding for example the premature termination of an experimental feature, which might occur if knowledge engineers misunderstood a normal "uptake curve" for lack of user interest). Similarly, in some embodiments time-based analysis of users' natural language inquiries may uncover emerging linguistic elements, such as the emergence of new "buzzwords", common off-topic questions such as "What do you think of the Avengers movie?", or topics of interest (any of which might suggest modifications to knowledge base to maintain a high degree of user acceptance and virtual assistant fluency).

Report generator 754 is typically a graphical user interface element that allows an analyst or other authorized user to design, configure, schedule, edit, manage distribution of, or view one or more periodic or ad hoc reports regarding operation of interaction engine 710 or virtual assistants hosted by it. Similarly to output from time-based analysis module 756, reports generally prove very useful in detecting trends or emerging problems with natural language applications, language or domain models, or the infrastructure or applications of interaction engine 710. For example, a report might provide tabular and graphical data pertaining to the number of occurrences of various types of interactions using one or more applications, and data for each row or category of interaction for each time period might include items such as the number and/or percentage of sessions that terminated either prematurely or in an unexpected way, the number of sessions that resulted in or involved a product sales inquiry, the number of those that resulted in a sale, and so forth. It is common in the art for reports to be useful in understanding such issues as diurnal patterns of user behavior (for example, users might be more likely to conclude purchases during early evening hours, and might engage in a higher level of off-topic "small talk" in the hours after midnight). It should be clear to one having ordinary skill in the art that any of the many infrastructure, data presentation, drill-down and drill-up, filtering, and other options known in the well-developed art of enterprise application reporting may be used according to the invention. Of course, the range of inferences that might be made through use of analytics based on natural language interaction engine 420 data is quite broad. For example, in some implementations it may be desirable to identify particular channels (media types, such as email, phone, kiosk, instant messaging, and so forth), particular operating systems, particular browsers, and similar specifics regarding a plurality of users. As an exemplary use of such data, it may be that users of Macintosh™ computers from Apple™ might be found to demonstrate certain typical habits and preferences, knowledge of which might allow for effective tailoring of natural language interaction engine 420 to better serve those customers.

Log file loader 753 is typically a graphical user interface element that allows an analyst or other authorized user to manage the configuration and scheduling of log file loading (or to configure real time data acquisition, when that approach is taken to gathering data from interaction engine 710), and to carry out ad hoc log file activities such as log file pruning, exporting of log files to other systems, archiving or configuring archival of log files onto long term storage systems, and so forth.

In most embodiments, the various components of analytics framework 750 are tightly coupled, for instance by allowing an analyst or other user to move directly from one tool or view to another with a simple user interface action such as selecting a button, choosing a tab, or picking a different view from a context-sensitive menu. For example, a user viewing a list of sessions in a category analysis screen 752 might select one or more sessions from a list (for example, by shift-clicking them using a mouse, or using a check button interface element) and then select "browse dialogs" to view the selected sessions in dialog browser 751. It should be appreciated by one having ordinary skill in the art that many styles of linking of related user interface elements and analytic functionality exist in the art, any of which may be used according to the invention.

Figure 8:
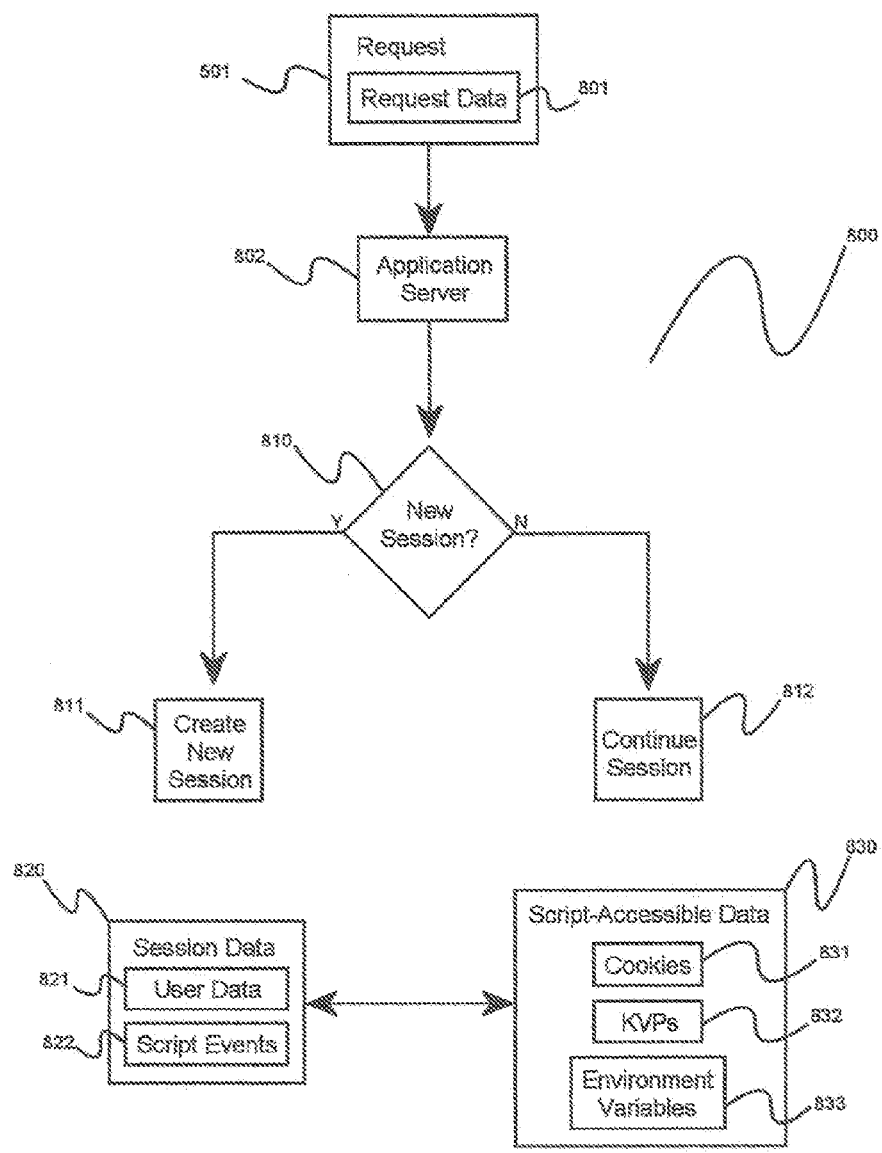
FIG. 8 is a process flow diagram illustrating a method for initial handling of a request, according to an embodiment of the invention.

FIG. 8 is a process flow diagram illustrating a method 800 for initial handling of a request 501, according to an embodiment of the invention. According to the embodiment, request 501 may be submitted by a user, for example via a web browser, a dedicated virtual assistant application, a speech application, a kiosk, or any other input means, to application server 802 for handling. Also, as noted previously, requests 501 or events submitted automatically by a third party application or by interaction environment 701 itself (for example, in response to a timer event's firing, a request 501 might be submitted to notify a user of an impending calendared meeting), so it is not necessary for initiation of method 800 that a user take express action. Nevertheless, for the purposes of illustration, request 501 will be treated herein as representative of any of the various means of initiation of a dialog step (that is, initiation of method 800 and related or follow-on methods). Request 501 will typically provide some amount of data 801 within its payload for use by interaction environment 701, such as a session identifier (typically but not necessarily a 32- or 64-bit unsigned integer) and additional request-specific data such as the actual user input provided, a transaction identifier, and any other relevant information. It should be appreciated by one having ordinary skill in the art that there are many types of request-specific data that might occur in different situations, any of which may be included in request 501 according to the invention. For example, in many cases device state data may be included in request 501, comprising data such as time of the request, physical location of a device associated with the request or of the user, a uniform resource locator (URL) corresponding to a web location from which the request was sent, and so forth. In some cases, if request 501 is a new request not associated with any existing interaction session, request 501 might not comprise a session identifier, or it might comprise a temporary sessions identifier provided by a web browser or other software via which request 501 is submitted; as discussed below, in most cases such a temporary session identifier would be replaced by a session identifier generated by application server 802. When the new session identifier is included in one or more responses 580, the web browser of other software via which request 501 was submitted will be able to associate the permanent session identifier with the previously-sent temporary identifier, and to thereby update (if required) any session-specific data it maintains (although in many cases browsers and other software applications are intentionally kept stateless and would not have a session data stack at all). In some embodiments, a user initiating a session might be recognized automatically by natural language engine 420 based, for example, on her Internet Protocol (IP) address or a cookie resident on her machine (many means for identifying returning web or application users are known in the art, any of which may be used according to the invention). When a new user is recognized as a previous user, in some cases data obtained during previous sessions with that user may be used to prepopulate session data.

In general, once application server 802 has received request 501 and its associated data, in step 810 it checks to see if it has an active session with the same session identifier as request 501 (of course, if request 501 only has a locally-generated (that is, generated locally to the source of request 501 rather than at application server 802) temporary session identifier, this will not be the case). If a permanent session identifier exists, then in step 812 that session is continued; otherwise, in step 811 a new session is created. When a new session is created, application server 802 instantiates a session object, which typically is instantiated with certain default session data 820 (for instance, at least a new unique session identifier, which can be used to associate future requests 501 and responses 580 with the particular session object, and therefore with session data); other common default data types may comprise session state variables, default session configuration options, and so forth. Also, on session creation, a user data 821 is generally initiated with at least a portion of the data 801 from request 501. In addition to session data 820 and user data 821, when a session is created one or more script events 822 may be loaded, each of which may be configured to execute upon occurrence of one or more specific events (for instance, session-specific events such as "session_created", "session_termination", "session_timeout", and the like; or other events such as environmental events, for example "environment_network_connected" or "environment_network_disconnected"). In most embodiments, scripts that are to be loaded on session creation 811 are determined based on factors such as session type (speech-enabled, browser-based, etc.) and the identity of the virtual assistant associated with the session (which is usually determined by some configurable combination of session type and request data 801). In most embodiments, all session data 820 is accessible to authorized scripts (that is, scripts that might be loaded as request-based scripts, as session-based scripts—such as a script which is executed on occurrence of a "session_created" event—or as system-level scripts—such as scripts that are executed every n minutes to collect data from active sessions). In addition, scripts are provided with access to script-accessible data 830 comprising for example (but not limited to) cookies 831, key-value pairs (KVPs) 832, environment variables 833, and the like.

In addition to session identifiers, identifiers for specific request/response pairs (i.e., request identifiers) and for specific flows (i.e., flow identifiers) or transactions (i.e., transaction identifiers) may be used according to the invention. When a new session is created in step 811, one or more of these identifiers may be created as well; for example, a request identifier could be generated for the specific request 501 that led to the creation of a new session—although a request identifier could be generated at the source of the request and used throughout the system thereafter, since application server 802 would not necessarily need to uniquely assign request identifiers, since it can drop a request identifier upon handling all flow-related activities required to generate one or more responses 580 to the request 501).

Figure 9:
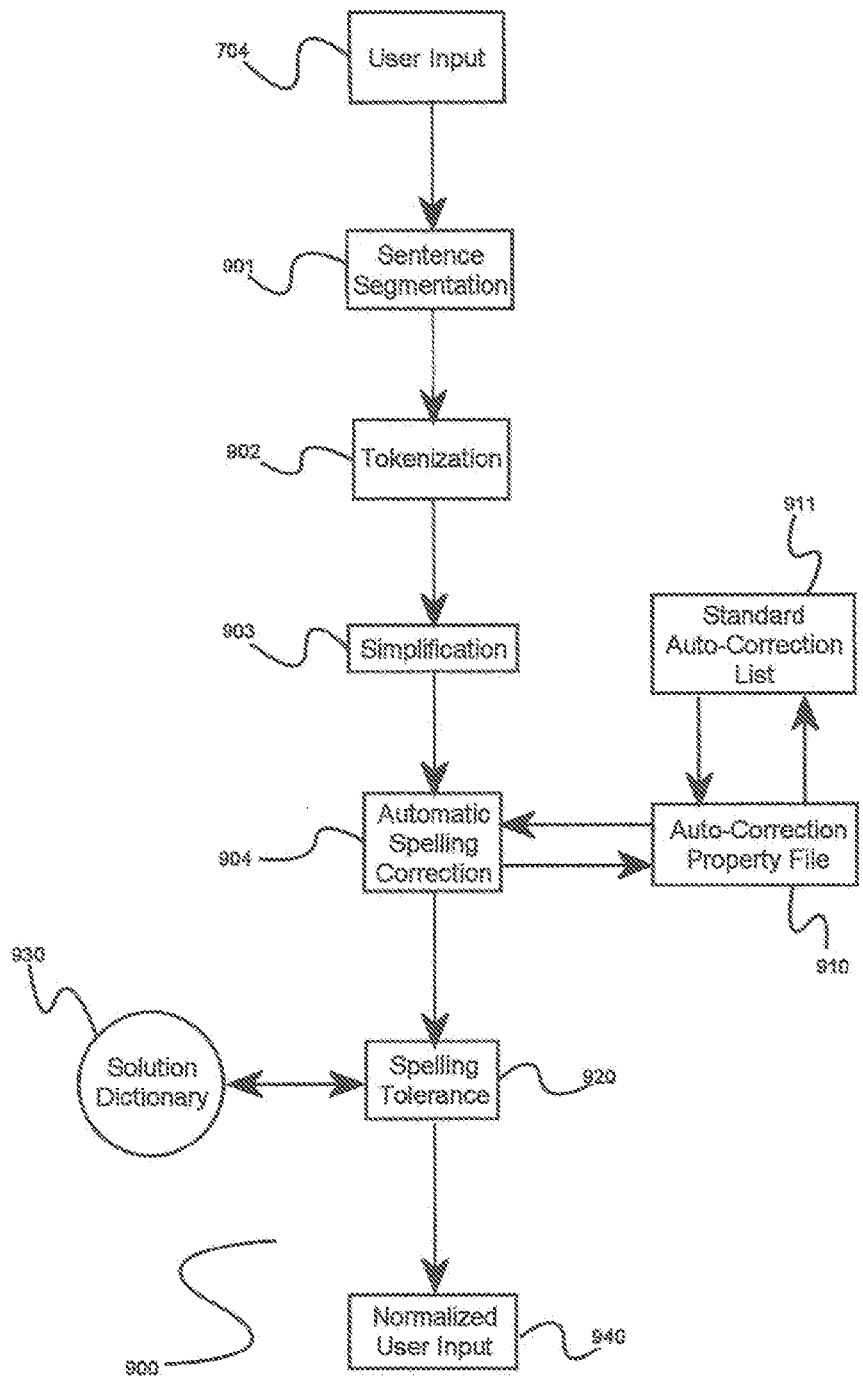
FIG. 9 is a process flow diagram illustrating a method for pre-processing input data for a parsing and interpretation process, according to an embodiment of the invention.

FIG. 9 is a process flow diagram illustrating a method 900 for pre-processing input data 704 prior to its submission to parsing or interpretation process 1000, according to an embodiment of the invention. According to the embodiment, user input being prepared for parsing or interpretation process 900 continues after preparation and evaluation of request data 801 have been completed, with request data 801 going through a process of segmentation into sentences 901.

According to the embodiment, segmentation of user input into sentences 901 may be carried out using various approaches known in the art, such as using a list of sentence delimiters (for example, ".", "!", and "?", although many other approaches known in the art may be used as well. Corresponding entries in an abbreviation list may override sentence segmentation. For example, considering the sentence, "Isn't there a ocntact section at www.whatever.com? Is your compny in Cancún?", it is clear that the strings "www." and ".com" have specific meaning (and would be suitably included in an abbreviations dictionary) and would be "protected" (ignored in sentence division process). This causes the input sentence to be evaluated as comprising two sentences, rather than four (which would otherwise happen since there were three sentence delimiters present)—specifically, "Isn't there a ocntact section at www.whatever.com" and "Is your compny in Cancún". Generally, as explained above, before sentence segmentation occurs, protected areas are generated based on a list, for which segmentation is prevented. It should be apparent to one having ordinary skill in the art that the particular approach to segmentation described here is a typical one for languages such as English, Spanish, or other European languages. For languages from very different linguistic groups, such as Chinese, other segmentation approaches known in the art may be used without departing from the scope of the invention.

A similar process may be used during tokenization 902 of sentences into individual words and other tokens as appropriate, to prevent inadvertent splitting of words with abbreviations or special characters in them and to extract words from text strings that may comprise other non-word elements (for example, text strings might comprise one or more emoticons, punctuation elements, digits, or even complex objects such as uniform resource locator addresses or URLs). Tokenization 902 of a sentence (typically into words) follows in accordance with one or more lists of word delimiters, or using other tokenization approaches known in the art. For example, the two-sentence text passage discussed above would be tokenized as follows. For the first sentence, the words would be {"Isn't", "there", "a", "ocntact", "section", "at", "www.whatever.com"}. For the second sentence, the list of words would be: {"Is", "your", "compny", "in", "Cancún"}. Simplification 903 may be defined by a set of defaults and possibly additional language-specific properties. Prepared English language property files, for example, would do this to the example sentences just described: "Isn't" maps to "isnt" (language objects typically are named without punctuation marks, although this is not necessary to the invention but rather is a convenience); "Is" maps to "is" (language objects typically are not capitalized, which again is a convention and not a requirement—any conventions would be stored in language properties 520); and "Cancún" maps to "cancun" (both rules just mentioned apply here); everything else would remain unchanged. For languages from very different linguistic groups, such as Chinese, other tokenization approaches known in the art may be used without departing from the scope of the invention.

During automatic spelling correction 904, individual words forming sentences may be compared with entries in one or more auto correction property files 910. If an entry is found, that word is exchanged with the corrected form. For example, in the second sentence of the example we have been discussing two letters are switched, a typographical error that a standard auto correction list 911 anticipates: it contains an entry of (compny, company). Spelling tolerance 920 may be applied to all (or some portion of) words in user input 704 that are not found in solution dictionary 930 (it should be noted that various approaches to spelling tolerance 920 are known in the art, beyond the novel one described herein; any automated spelling correction techniques known in the art, such as i-spell or a-spell, may be used according to the invention). Dictionary 930 may be composed of words taken from language objects. For these words, a property file mechanism 910 finds a closest match in dictionary 930 within some defined spelling tolerance value 920. Instead of an unknown word, a closest dictionary 930 word may be used within parsing or interpretation process 1000, although in some cases unknown words may be left unchanged (for example, to be considered using various analytics tools at a later time by an NLI developer, possibly leading to creation of one or more new language objects incorporating the unknown word). It has been found that spelling tolerance 920 has an important effect on performance.

In case of a default spelling tolerance 920 threshold (such as 15%), it could be, depending on solution data 730, that input ocntact fulfills a word condition contact (correspondence generally depends on both dictionary 930 and a threshold value). In most embodiments, special evaluation rules may be used to assist; for instance, the example just shown has two errors in seven characters, which would generate an error value of around 29%, but a special evaluation rule that looks for two switched characters brings the value within threshold 920 and causes a match to occur. As a convention, in some embodiments if the threshold is set to 0%, spelling tolerance 920 is skipped. At the end of pre-processing 900, modified user input 940 is delivered to subsequent steps (most particularly to parsing and interpretation process 1000).

Figure 10:
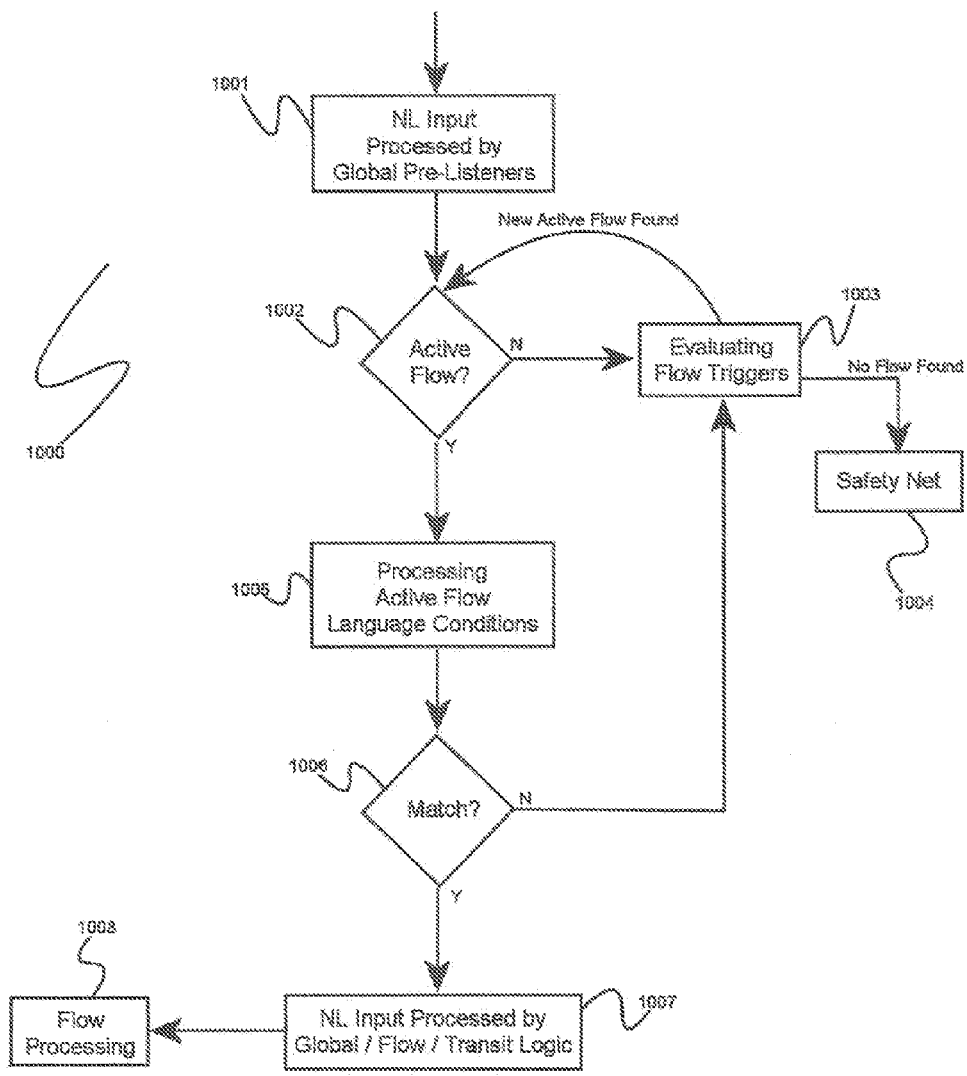
FIG. 10 is a process flow diagram illustrating a method for interpreting natural language input from a user, according to an embodiment of the invention.

FIG. 10 is a process flow diagram illustrating a method 1000 for determining the most suitable interpretation rule in the most suitable flow to interpret a natural language input from a user, according to an embodiment of the invention. In general, process 1000 carries out a series of steps that involve determining one or more language recognition rules that the user input satisfies, and then taking appropriate actions each time a rule is satisfied. According to the embodiment, in step 1001, natural language input 940 is processed by one or more global pre-listeners. Global pre-listeners are language recognition rules that are specified globally within a specific solution (that is, within solution data 730), and that are checked first when a new user input or request 940 is received (after input pre-processing 900 is completed). Global pre-listeners are generally used to extract information from a user input 940, for later use in other language recognition rules or script conditions. For example, a global pre-listener might be configured to extract a user identity from one or more data fields that may be present in request data 801, and populating an appropriate session-level variable if such data is found; such session variables as may be populated during processing by global pre-listeners is then accessible to any language recognition rules 735, integrations 732, flows 736, or other script or processing elements. Once any global pre-listeners have been executed, in step 1002 the natural language application verifies whether there is any active flow currently for the application (active flows are typically kept in memory 240 but may be stored elsewhere in some embodiments). If there is no active flow, in step 1003 the application will evaluate conditions belonging to any flow triggers to determine whether user input 940 satisfies any flow triggers, which if satisfied will identify a new flow to make active. Flow triggers are generally configured within solution data 730 to be executed in a specific order, which allows developers to deterministically manage how flows are invoked; however, other approaches are possible according to the invention, for example evaluating all valid flow triggers and scoring each successfully satisfied trigger using some scoring process, and then selecting a highest scoring flow based on these scores and activating that trigger (in such exemplary embodiments, scripts may dynamically carry out scoring using parameters which may depend on an identity of the user, or on system or application status, on time of day, or any other programmatically accessible value). If no flow triggers are satisfied in step 1003, then in step 1004 one or more safety net rules may be executed, and process 1000 terminates. For example, in step 1004 a safety net might be invoked that leads to a response such as, "I'm sorry, I don't understand your question; could you ask me another way?" In some embodiments, a plurality of safety net flows may be configured either within solution data 730 or as global properties of interaction environment 701; in such embodiments, in step 1004 a random (or other programmatic) selection of a safety net expression from one of the plurality of safety net flows is selected and provided to the user. When an active flow exists during step 1002, the application will process user input 940 using one or more language recognition rules (or conditions) that are defined for the active flow in step 1005; generally, language recognition rules may be selected at least in part based on an identity of or results from the last visited node of the active flow or of the application as a whole (that is, user input 940 is tested against one or more outgoing language recognition rules of the last visited node of the currently active flow. In step 1006 a check is made whether a language recognition rule was satisfied in step 1005; if so, then user input 940 may be further processed in step 1007 with post-listeners on global, flow and transition level in that order. These listeners are typically used to extract information from the matching user input 940 for use in the currently active flow. After this, flow handling process 1000 ends and dialogue manager takes over as the application resumes flow processing in step 1008, repeating process 1000 until no matching transition exists (as checked in step 1006), or until a transition is reached which requires new user input. If no language recognition rule was satisfied (when checked in step 1006), the application again evaluates any conditions of flow triggers in step 1003 to potentially identify a flow to activate (or to invoke a safety net in step 1004, at which point process 1000 terminates).

Figure 18:
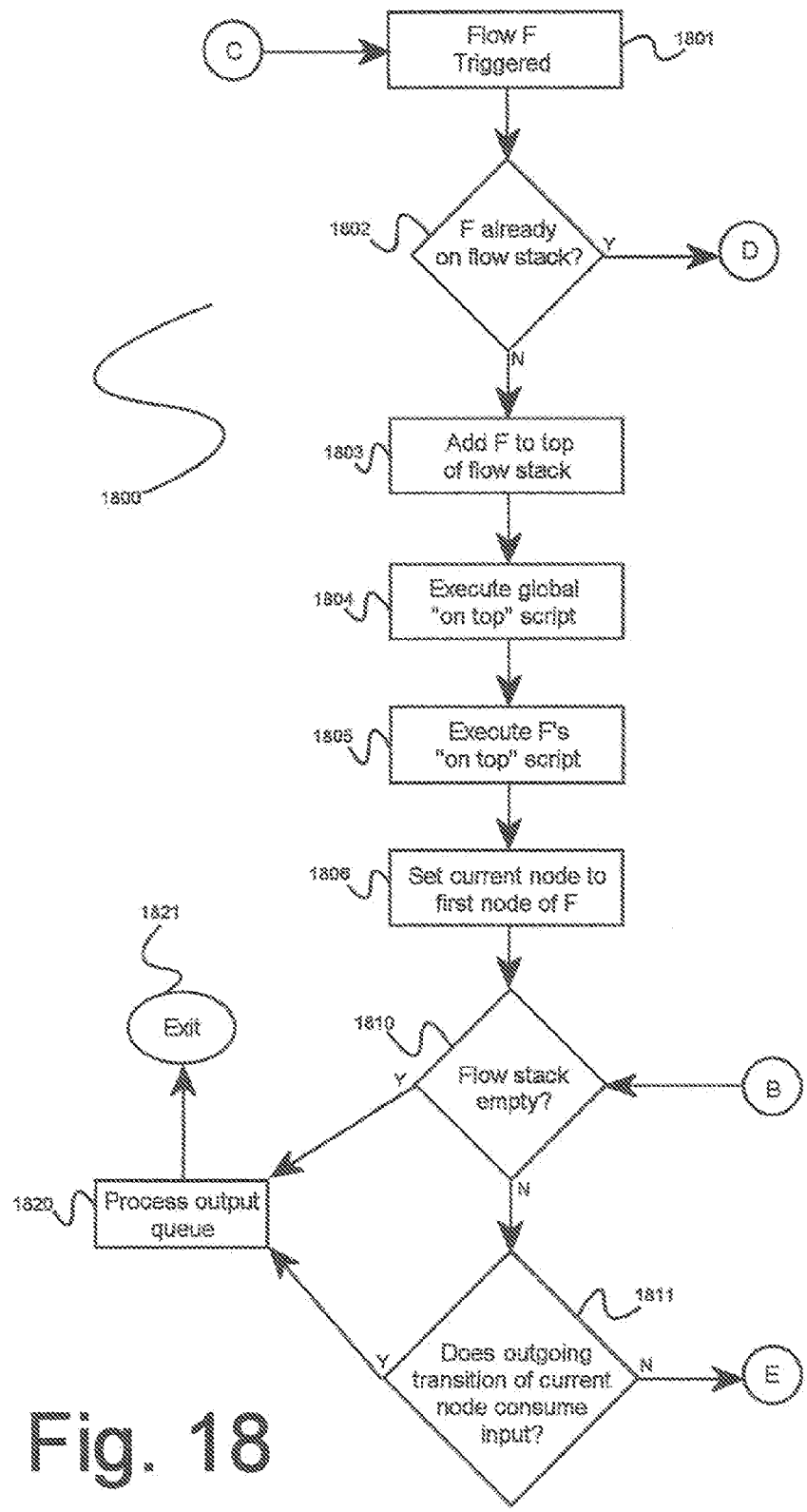
FIG. 18 is a process flow diagram of a method for processing dialog flows, according to an embodiment of the invention.

FIG. 18 is a process flow diagram illustrating a method 1800 for processing dialog flows, according to an embodiment of the invention. According to the embodiment, in step 1801 a flow F is triggered, as described above with reference to FIG. 10. In step 1802, a check is made to determine if flow F is already present on an active flow stack (in some embodiments, a single persistent flow stack is maintained, even when empty; in others, flow stacks may be deleted when emptied, in which case a new flow stack would be created as a preliminary in step 1802 when no flow stack was present when flow F was triggered in step 1801). If flow F is determined to be already present on the active flow stack, then execution passes to the subprocess used to drop flows from an active flow stack, which is described starting with step 1830 below, with reference to FIG. 18A. Otherwise, in step 1803 flow F is added to the top of the active flow stack. Then, in optional step 1804, one or more global "on top" scripts may be executed if present; "on top" refers to the active stack, and in general "on top" scripts are executed whenever an active stack pointer is moved to the top of an active stack (as in this case, when flow F is placed on top of the stack). Similarly, in optional step 1805 any "on top" scripts belonging to flow F itself is executed. Then, in step 1806, the current node variable (or stack pointer) is set to point to the first node of flow F, and execution passes to an execution loop starting with step 1810. In step 1810, a check is made to determine if the active flow stack is empty. If it is, then in step 1830 the output queue is processed (the output queue is a stack or queue comprising output elements added during flow processing; in many cases, as will be seen, various steps trigger an output but do not signify the end of flow processing, and in these cases the triggered output is added to the output queue and execution proceeds with the next required step). Processing of the output queue involves creating a response document suitable for rendering to a user of a natural language application, the document being composed from any outputs present in the output queue when step 1830 is invoked and thereupon emptying the output queue and proceeding to exit the method in step 1821. Output processing is described in detail below with reference to FIG. 11. If the active flow stack is not empty in step 1810, then in step 1811 a check is made to determine if the outgoing transition of the current node is an input-consuming transition. If it is, then execution again passes to step 1820 and the output queue is processed (which delivers any output to the user and requests the appropriate input), and the process exits at step 1821, and natural language interaction engine 703 then waits for further user requests or for a session end event (for example, a session end event might be generated if either a user closes an application through which she was interacting with natural language interaction engine 703, or if a timeout occurs without further user action and thereby triggers firing of a session end event). If the current node's output transition is not input-consuming, then execution passes to the subprocess starting at step 1840, which is described below with respect to FIG. 18A.

Figure 18A:
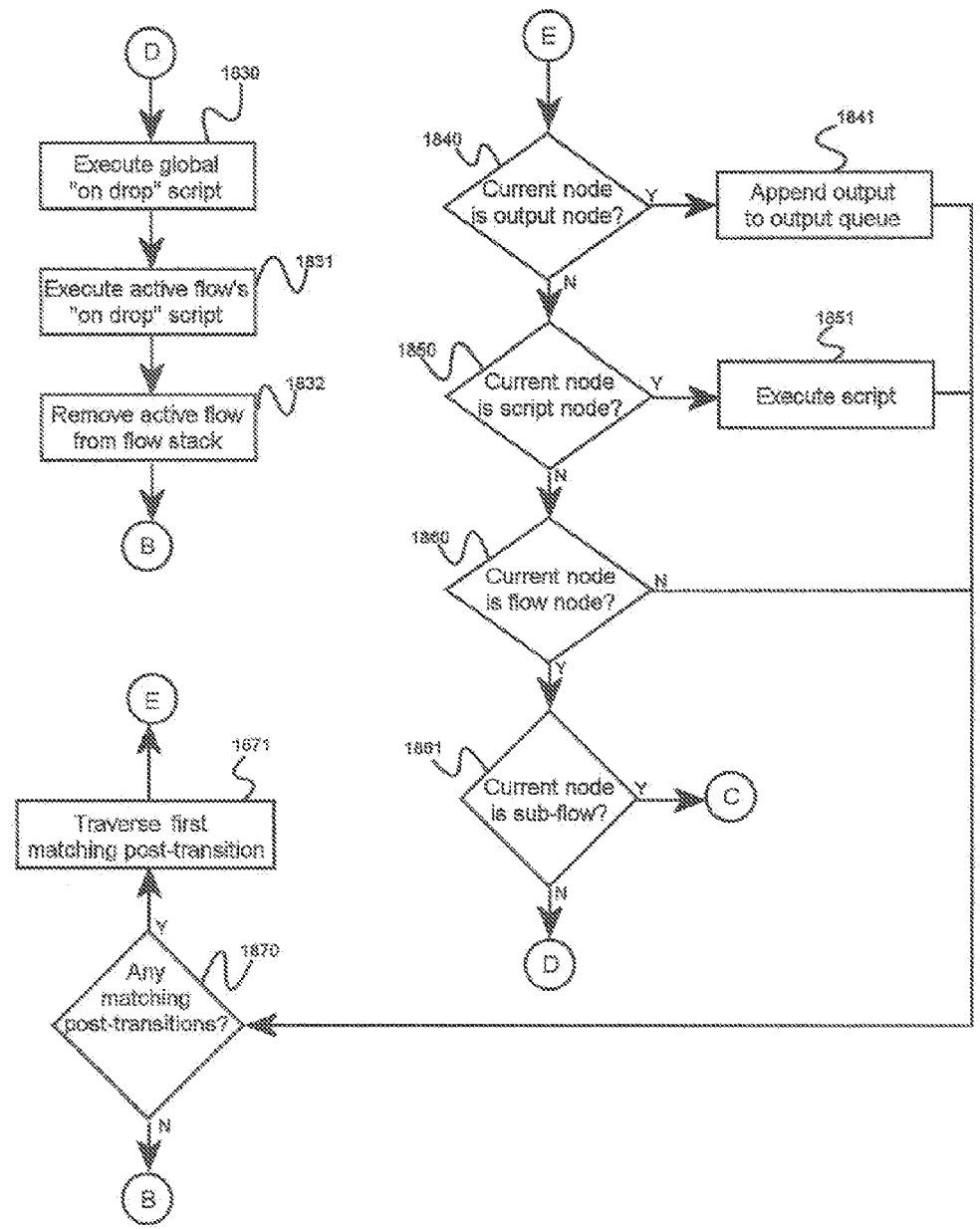
FIG. 18A is a process flow diagram of a set of methods used in accordance with an embodiment of the invention, with the method of FIG. 18.

FIG. 18A is a process flow diagram of a set of subprocesses of the method of FIG. 18, in accordance with an embodiment of the invention. In step 1840, a check is made to determine if the current node is an output node (that is, a node that generates output). If it is, then in step 1841 any generated output is appended to the output queue and execution continues with step 1870. If the current node is not an output node, then in step 1850 a check is made to determine if the current node is a script node (that is, a node which comprises an executable script). If it is, then in step 1851 the script corresponding to the script node is executed, and again execution passes to step 1870. If the current node is not a script node, then in step 1860 a check is made to determine if the current node is a flow node (that is, a node within a flow that requires initiation of a new flow); if it is, then in step 1861 a further check is made to determine if the current flow node corresponds to a sub-flow (that is, a flow that is specifically intended to operate as a nested flow within a parent flow, in an analogous fashion to the behavior of subroutines in programming, returning execution to the current node of the active parent flow when the sub-flow is completed). If it is, then execution proceeds via label C to step 1801 in FIG. 18; if it is not, then the current node corresponds to a flow that is intended to replace the current active flow, so execution passes to the "drop flow:" subprocess starting with step 1830, upon the completion of which the new flow (that is, the one that was specified in the current node in step 1860) is triggered in step 1801, and method 1800 begins afresh. When flow passes to step 1870 upon completion of handling a given node, in optional step 1870 a check is made to determine if there are any matching post-transitions (post-transitions are conditions that are tested, in a defined order, upon completion of processing of a node; a matching post-transition is a post-transition whose condition is satisfied). If there are any matching post-transitions, then in step 1871 the first matching post-transition is traversed (which replaces the current node variable with the identity or address of a new node referred to in the post-transition), and execution resumes using the new current node at step 1840. If there are no matching post-transitions, then execution resumes at step 1810 with a check of the flow stack to determine if it is empty.

Step 1830 is the first step of a subprocess for dropping an active node. In step 1830, any global "on drop" scripts are executed in a specified order (there will often be no global "on drop" scripts, so in effect this step, and indeed step 1831, is an optional step). Then, in step 1831, if any "on drop" scripts are specified in the active flow being dropped, they are executed in order, and finally in step 1832 the active flow is removed from the flow stack and execution passes to step 1810 with a check of the flow stack to determine if it is empty.

Figure 11:
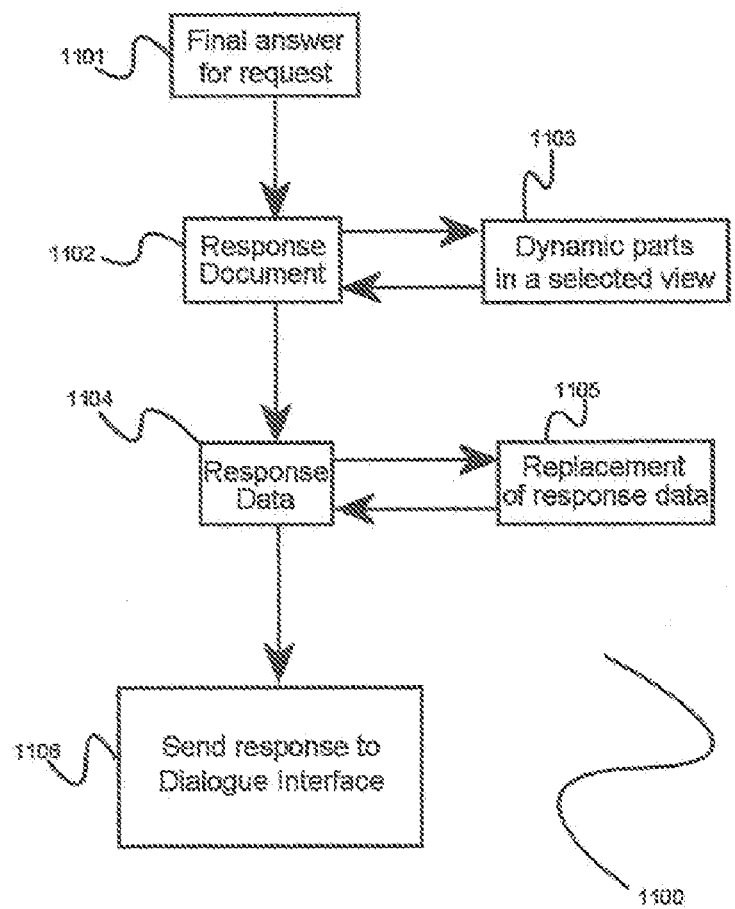
FIG. 11 is a process flow diagram illustrating a method for preparing a response for delivery in response to a request, according to an embodiment of the invention.

FIG. 11 is a process flow diagram illustrating a method 1100 for preparing a response 580 for delivery in response to a request 501, according to an embodiment of the invention. According to the embodiment, in step 1101 a final response 501 to a user request 580 is taken as an input to the process. The final response could in many cases be comprised of more than one response element, for example there could be two specific informational responses followed by a prompt. This output text is assembled, in step 1105, into an output document, for example by creating an HTML document that is suitable for display on a web page, or a VoiceXML document suitable for passing to a voice browser, in cases where a speech-enabled dialog is being conducted. In some embodiments, one or more of session data elements 820 may comprise an emotion attribute. For example, a response document might contain a markup fragment such as shown below.

```
DI.initialState.myDynamicInterface = {
    communication : {
        serverURL : 'http://www.mysite.com/lp/'
    },
    ui : {
        layoutPath : 'my_layout.div'
        avatar : {
            emotionPath : '/emotions/',|
            emotions: {
                neutral: 'neutral.swf',
                happy: 'happy.swf',
                sad: 'sad.swf'
            },
            initialEmotion : 'happy',
            fallbackEmotion : 'neutral',
                alternate : '/emotions/alternative.png'
        }
    }
};
```

The code sample shown, expressed in a typical markup format (in this case, JSON), is an example of a dynamic interface according to the invention, wherein one or more user interface elements displayed as part of a response 580 to a user's request 501 is rendered "dynamic", in that it is possible, through manipulation of session-level variables such as emotions, to indicate to the user interface renderer (for example a web browser) which of several possible emotion-indicating avatar visualizations should be shown the requesting user. In the example shown in the code fragment above, emotionPath refers to a (relative or absolute) path to one or more resources files (images, video clips, and the like), each of which may correspond to one or more of the available emotions (in this example, one or more of "neutral", "happy", and "sad". Also, the example shows a selection of a default or initial emotion for visualization ("happy"), and a fallback emotion for use when for example a request 501 results in a safety net response 580. By use of dynamic emotional states for a virtual assistant (rendered for example by showing an avatar with various emotional affects, as is known in the art to do), the embodiment enables a much more dynamic and natural user experience (when optional step 1105 is used). Once a complete response document is ready, the selected response may effect, among other things, certain processes (such as mailing or writing of files; such actions may be triggered by scripts that run after detection) and therefore in step 1110 response data is made available as needed. Parts of these data form, together with more general interaction environment 701 data, a dynamic part of a response document, and are available in the output data. In some embodiments, one or more view variables that receive their values from response data may be modified in step 1111 during runtime via script expression replacement and/or via modifiable variables.

Figure 12:
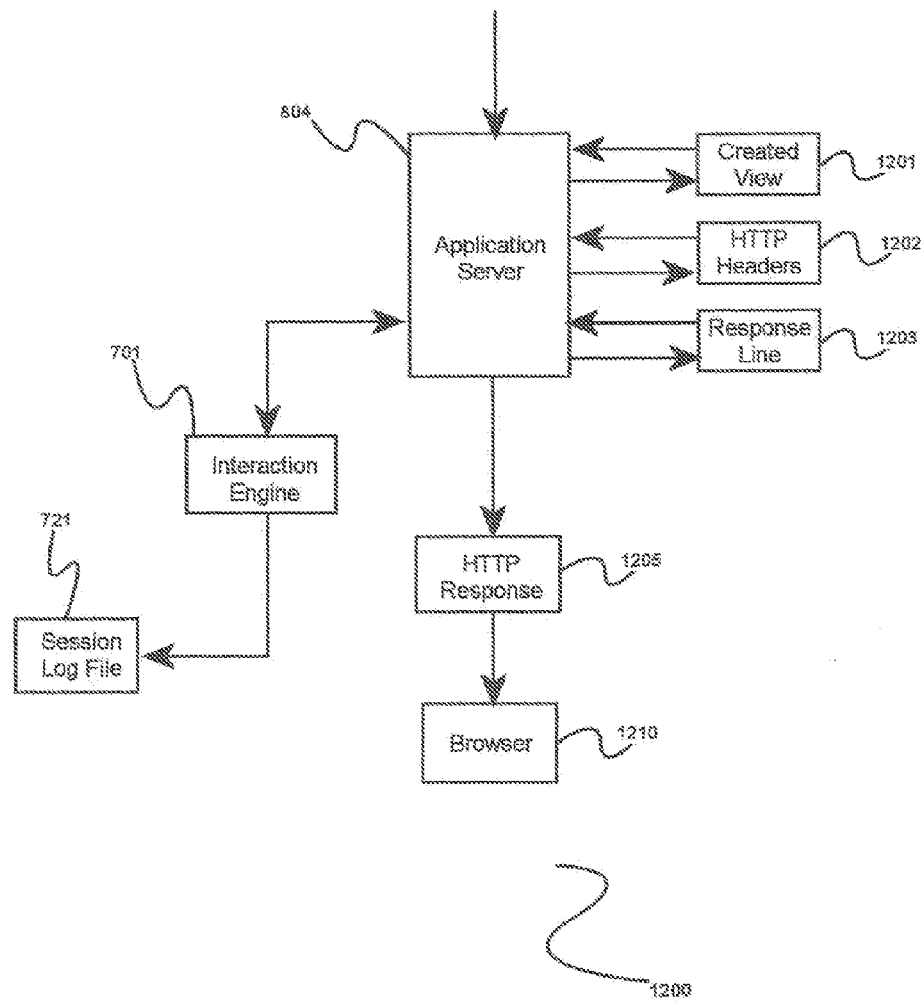
FIG. 12 is a process flow diagram illustrating a method for delivering a response to a user, according to an embodiment of the invention.

FIG. 12 is a process flow diagram illustrating a method 1200 for delivering a response 580 to a user, according to an embodiment of the invention. According to the embodiment, application server 802 will typically take the created view 1201, and optionally one or more additional HTTP headers 1202, that have been created, and add a response line 1203 to it. The completed HTTP response 1205 thus generated is then delivered to the requester, for example by delivery to the requester's web browser 1210 from which request 501 was originally sent, which displays the document (or computes changes in a currently viewed document from the transferred data). In this response 580, session information is integrated by the application server to identify the next request of requester as belonging to the same session. At this point commonly a session timeout timer is activated in order to detect, for example, abandoned sessions (sessions where the user leaves without "saying goodbye"). If the user makes another request before the session timeout timer fires, the current session is continued. When a user positively leaves a session, or when a session timeout timer fires without intervening user action, application server 802 informs interaction environment 701 that the session has timed out, and interaction environment 701 then takes the dialog data and writes it into a session log file 721.

Figure 13:
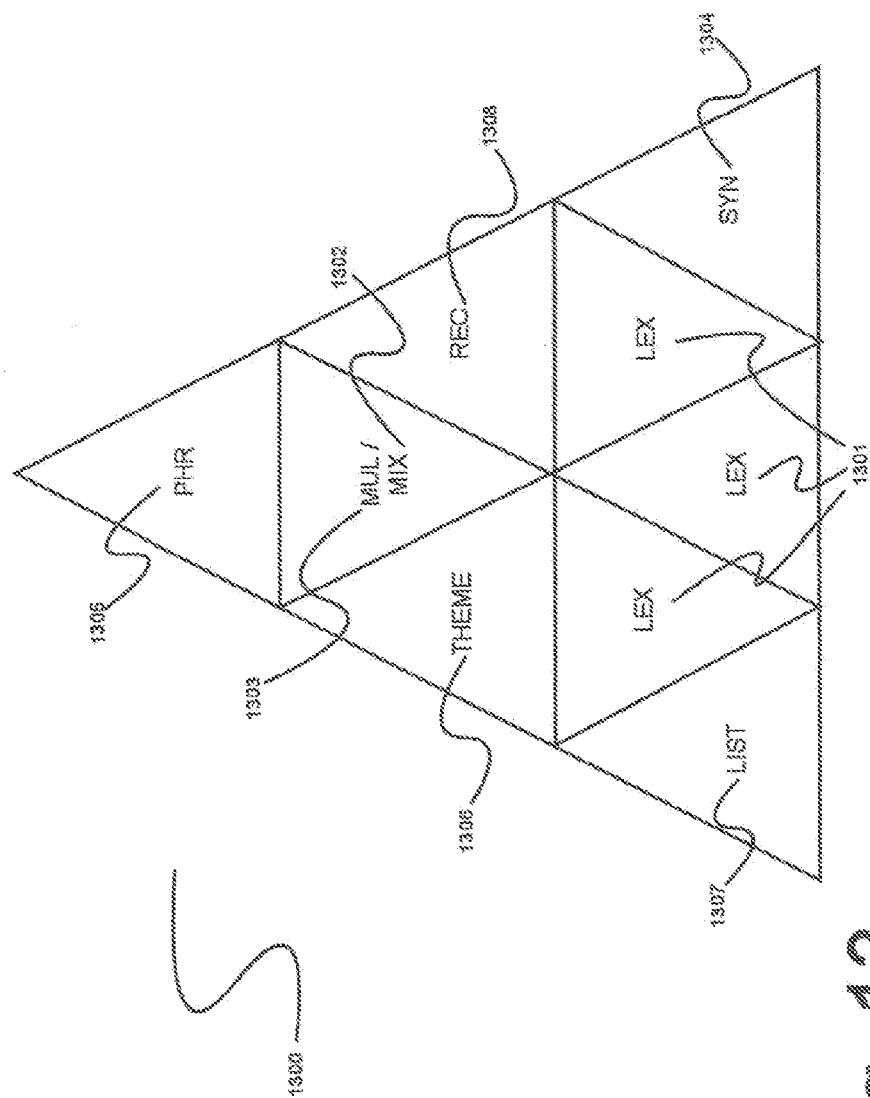
FIG. 13 is a block diagram illustrating language object types within a language object library pyramid within a natural language application, according to an embodiment of the invention.

FIG. 13 is a block diagram illustrating language object types within a language object library pyramid 1300 that may be used within a natural language interaction engine (and correspondingly within one or more natural language interpretation applications implemented within a natural language interaction engine), according to an embodiment of the invention. According to the embodiment, language object libraries 1300 are structured hierarchically with lexical entries at bottom and complex linguistic structures at the highest level of hierarchy. An underlying principle behind this hierarchical arrangement is that higher levels reference elements from lower, linguistically less complex levels. Thus higher-level reference elements benefit from any improvements that may be made that occur on lower levels in context of maintenance. Rigorous re-use of lower-lying elements in hierarchy may increase an overall consistency of the language object base and produce a leaner, more coherent overall structure.

Language objects are linguistic rules that have meaning and structure and that are used to recognize words, phrases, or a combination of both. A language object may include one or more synonyms and phrasings that depict the same idea (e.g., different ways of answering affirmatively such as "yes", "yeah", "okay", "of course", "by all means", "sounds great", "give it a go", and so forth). A language object may contain the required grammatical alternatives for a word. For example, for "to be", a language object might contain, among others, tokens (words) such as "be", "am", "is", "are", "were", "was", and so forth. By convention, a special character such as "%" may be used as the first character in the name of a language object to signify that the name is that of a language object; in some embodiments, a lexical convention of this sort assists natural language interaction engine 703 in identifying the beginning of a sub-rule such as a language object.

The following sections describe different types of language objects that may be used to build a language object base as part of a knowledge base of solution data repository 630. Language object types are listed ordered roughly by their increasing degree of linguistic complexity.

Lexicon Language Objects (LEX.*)

LEX 1301 language objects are the smallest, most elementary building blocks of a language object library from which more complex language object structures are built. That is, LEX 1301 language objects generally correspond to and can taken as basic dictionary entries. A LEX 1301 language object may correspond to a lemma and capture a full set of inflectional forms or variants of a given word, irrespective of whether that set may have several different meanings. There typically will be only one LEX 1301 language object created for a lemma and its set of inflectional forms, as is illustrated here by a language object representing the noun "bark":

BARK.LEX..NN=bark/barks/bark's/barks'

It will be appreciated by one having ordinary skill in the art that there are any number of other object labeling approaches that could be adopted; these exemplary embodiments are not to be taken as limiting. For purposes of consistency, the examples given below will follow one approach.

LEX 1301 language objects always belong to a specific part of speech. If more than one part of speech is derived from same stem, separate LEX 1301 language objects are created for each one of these. For example:

LEX.BARK.NN=bark/barks/bark's/barks'
LEX.BARK.VB=bark/barks/barked/barking

Identical words may sometimes have a similar part of speech, but may inflect differently. In that case, they may correspond to two different lemmas and therefore possibly two different LEX 1301 language objects may need to be created, one for each word. For example, the word land in Swedish may have two meanings (country and garden patch), which share several inflectional forms but not all of them. This may be modeled as:

LEX.LAND1.NN=land/lands/landet/landets/länder/länders/länderna/ländernas (countries)
LEX.LAND2.NN:=land/lands/landet/landets/landen/landens (garden patch)

Multi-Word Units (MUL.*)

MUL 1302 language objects may form the multi-word correspondence to LEX 1301 language objects, as they capture dictionary-level entries of multi-word units that are meant for use as building blocks in higher-level language objects. MUL 1302 language objects may be generally built from LEX 1301 language objects. MUL 1302 language objects may only contain inflectional variations of a multi-word unit captured by their kernel name (as opposed to higher level language objects which may also contain synonymic variations thereof). Exceptions to this general rule may be constituted by slight changes in word order and variations in function words. Phrasal verbs (verbs with a preposition) form typical MUL 1302 language objects (for example, the phrasal verb "give up" may constitute a MUL 1302 language object comprising two LEX 1301 objects ("give" and "up"). MUL 1302 language objects may also be used for other kinds of word groups that often appear consecutively, therefore it may be convenient to have language objects that may be referred to when building higher-level language objects.

Mixed Language Objects (MIX.*)

Mixed language objects 1303, group LEX 1301 language objects which represent lemmas deriving from a same lexical root, e.g., happy, happily and happiness. This type of language object may be referred to as a mixed language object since it may contain entries with various parts of speech (for example, a mixed language object 1303 could comprise a language object further comprising the LEX objects LEX.HAPPY.ADJ, LEX.HAPPILY.ADV, and so forth.

Since linguistically, a set of lemmas deriving from a same root is fuzzy, a MIX 1303 language object may be defined with various degrees of restrictiveness as deemed appropriate in its respective context of use. Due to a potentially diverse list of language objects referenced by a MIX 1303 language object, names of MIX 1303 language objects typically do not reference a specific part of speech. Grouping only an adjective and its corresponding adverb (rather than all words deriving from a same root) may be used in the same context. In this case, only a certain subset of all possible parts of speech may be included in the language object. This may be signaled in a language object name by adding a corresponding part of speech suffixes in alphabetical order, separated by underscores. Included are parts of speech suffixes in those cases to provide a clearer description of the language object's content.

Word-Level Synonym Language Objects (SYN.*)

Since natural language may have various ways of expressing a same or very similar concept, language object library needs structures to represent types of synonymy. Synonymy may occur at word-level (for example, different words denoting a same concept), or at phrase level (for example, different, linguistically more complex ways of expressing a same concept). Synonym language objects may similarly either be at word-level or at phrase level. SYN 1304 language objects are conventionally synonym language objects at word-level.

All words grouped in a SYN 1304 language object are interchangeable. Phrase-level language objects are marked as PHR 1305 language objects (see paragraph below referring to PHR 1305 language objects). SYN 1304 language objects may group LEX 1301 and MUL 1303 (and occasionally also PHR 1305) language objects to represent words or phrases sharing the same, or a very similar meaning.

There are, of course, other possible approaches to grouping. Words with similar meanings may be grouped in more than one way, with different objectives and with varying degrees of granularity. It will be appreciated by one having ordinary skill in the art that there are any number of other grouping approaches that could be adopted; these exemplary embodiments are not to be taken as limiting.

Words may generally have more than one meaning—their senses. Note that SYN 1304 language objects may be defined with respect to a certain sense of a word. An adjective sharp may have at least two senses: an original one used with knives for instance, and a metaphorical one used for describing intelligent people. He is really sharp means the same as He is really intelligent, yet the knife is sharp cannot be replaced by the knife is intelligent. Therefore, these two senses may be represented by different SYN 1304 language objects. One may be able to think of a context in which all words grouped in a SYN 1304 language object are interchangeable. Since words may have several senses, basic SYN 1304 language objects are sometimes context-dependent.

Proper synonyms may typically belong to a single part of speech. This may hold for basic SYN 1304 language objects. Whenever entries in a SYN 1304 language object are of the same part of speech, an appropriate part of speech suffix may be added to a language object name. If a language object contains entries with different parts of speech, no suffix will generally be added (again, naming described herein is merely exemplary of one embodiment, and not limiting).

SYN 1304 language objects may be used to capture close synonymic relationships between words; this may be referred to as a language object having narrow semantic scope. One may wish to capture synonymic groupings that semantically are somewhat looser and hence have a wider coverage. To mark an extended coverage of these wider-scope synonym language objects we add the suffix .WIDE to the language object name.

Phrase-Level Language Objects (PHR.*)

PHR 1305 language objects may represent all possible ways of expressing a phrase or partial sentence, for example: "What is the price of X?", "Agreement/Consent", or "How long will it take for X to happen?" A linguistic phrase may be arbitrarily complex and so may PHR 1305 language objects. Some PHR 1305 language objects may capture noun phrase units, while others may capture several sentence constituents. As such, PHR 1305 language objects may typically reference LEX 1301, MUL 1303, SYN 1304 and other PHR 1305 language objects. For example, a PHR 1305 language object may refer to other PHR 1305 language objects, as when PHR 1305 "what is your name" is composed from phrases 1305 "tell me", "what is", as well as LEX 1301 objects "your" and "name".

If a PHR 1305 language object is comprised of content-light words such as I, is, what, extra attention may need to be paid to word order. It should be noted that other words may come between conditioned constituents when using a +-operator. Important PHR 1305 language objects may be tested against real inputs. For example, a code may be restricted by for number, tense or any other morphosyntactic feature where appropriate. In a language object like PHR.CAN_I_BUY it does, for example, not make sense to allow for past tense forms of a verb.

List Language Objects (LIST.*)

LIST 1307 language objects contain lists of concepts, such as colors, car brands and countries. LIST 1307 language objects may be composed of other LIST 1307 language objects. List language objects 1307 that list entries of the same part of speech (POS) may also indicate this part of speech in language object name.

Theme Language Objects (THEME.*)

Theme 1306 language objects may group words on basis of theme. Words generally have different meaning, but are associated to a common theme. One may think of theme language objects as keyword language objects. An ideal THEME 1306 language object may not be dependent on context, but signals a theme regardless of where it is triggered. For example, a THEME 1306 language object could be "CAR", and could comprise various synonyms for "car", as well as other language objects such as "car parts" (a LIST 1307 object), "car brands", and so forth.

Miscellaneous Language Objects (REC.*)

REC's 1308 are "quasi-rec's", which may not fit under PHR 1305 or any other category. They may be very wide, or rather specific, but may not have consistent structure. Both their scope and naming may be highly pragmatic.

Project-Specific Language Objects (PROJ.*)

Some high-level language objects may be very likely to occur in many different types of projects such as questions about a company, about opening hours or driving directions to stores or offices. These language objects may occur in many instances, so it may be economical to code a linguistic part of them only once and adapt a comparatively minor set of differences in content from instance to instance. This set of language objects may be referred to as PROJECT language objects ("PROJ"). To make PROJ language objects recognizable from project to project, they may be named the same across projects. It will be appreciated by one having ordinary skill in the art that condition codes may be adopted based on individual requirements of a project at hand.

Inflectionally Constrained Language Objects

A language object structure may provide us with capability to refine broader language objects by imposing specific constraints or filters upon them. One application of a constraining operation, for example, may be to obtain only past tense forms for a given verb from a language object representing all inflectional forms of that verb. To this effect, a constraint operator '?' may be used to selectively form conditional subsets of entities represented by a given language object. As an example, consider a need to obtain only past tense inflections of the verb 'to go'. While a new language object may be created to capture those specific entities, we may also use a constraint operator on a generic language object to filter for its past tense forms.

Figure 14:
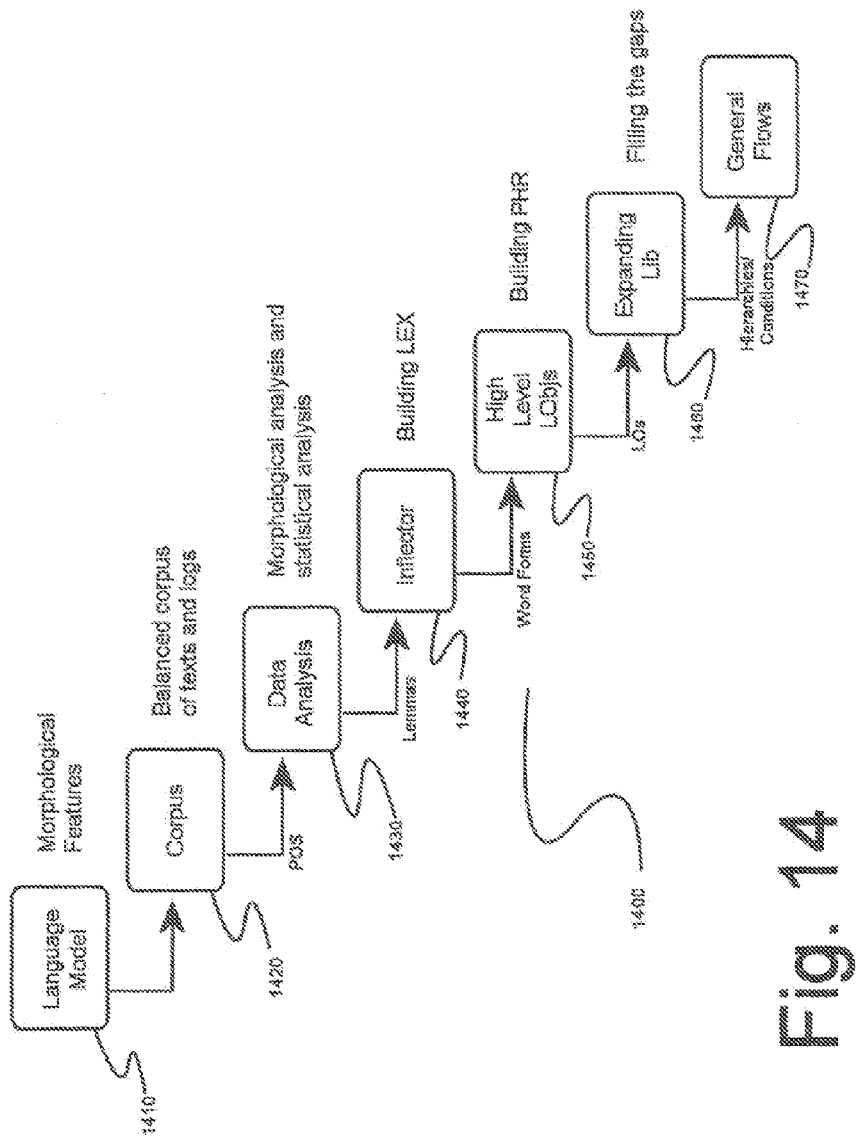
FIG. 14 is a block diagram illustrating a building process for a language library within a natural language application, according to an embodiment of the invention.

FIG. 14 is a block diagram illustrating a building process 1400 for a language library within a natural language application, according to an embodiment of the invention. Generally, language models 1410 are built by assembling a large set of small building blocks. With the exception of LEX 1301 language objects, language library objects always refer to other language objects. Lower-level language objects are used when defining higher-level language objects. Optimization of lower level language objects may propagate into higher-level language objects, which reference them.

As shown in FIG. 14, in order to build a language model, one typically starts with a prebuilt language model 1410 of a target language. Language model 1410 is built by conducting morphological analysis of a language to determine its underlying structure and its vocabulary (that is, a set of lemmas from which utterances in the target language may be built). After obtaining an applicable language model, an NLI developer typically acquires a balanced corpus 1420 representing a large set of utterances (typically, but not necessarily only, a corpus 1420 of text samples such as Wikipedia, logs of natural language interactions between users or between users and virtual assistants or other natural language applications, or question-and-answer pairs, or "QAPs") that are representative of the language to be modeled. Usually, preprocessing of corpus 1420 is performed to tag each word according to its part of speech (a process known as "POS tagging", which may be performed manually or, more typically and preferably, using any of various POS tagging tools known in the art). Once a corpus 1420 has been prepared and POS-tagged, in step 1430 data analysis is performed on the corpus. Data analysis 1430 usually comprises at least morphological analysis and a variety of statistical analyses. Morphological analysis is conducted to "lemmatize" corpus 1420; that is, each word is analyzed (or "stemmed") to determine which lemma is the basis for the word. For example, the word "banking" could be many things; after POS tagging, it would be tagged as a gerund/noun, but ambiguity would remain because would is unclear whether "banking" refers to an activity of a financial institution or of an airplane. Morphological analysis would convert "banking" to its lemma form ("bank"). Once morphological analysis has been conducted on corpus 1420, various statistical analyses may be conducted, typically comprising at least an analysis of lemma frequencies (that is, what percentage of word in corpus 1420 belong to each specific lemma), to enable a modeler to prioritize activities (since rare words might be ignored at least initially to allow more time for thorough modeling of more commonly-used language elements). An inflector 1440 creates all word forms of the lemmas found (even word forms not found in the corpus) in order to build the LEX language objects semi-automatically. Thus, as an output from inflector 1440 we would have a full collection of word forms for those words found most commonly in the target language. Statistical analysis of corpus 1420 may also comprise analyzing frequencies of various combinations of words (for example, bigrams, trigrams, and n-grams), in order to identify commonly occurring word pairs, triplets, and so forth. These common groupings may be used to build a collection of higher-level language objects 1450 such as PHR (phrase) objects. These high-level language objects may in turn be augmented by expanding the library 1460 to fill in gaps identified either automatically or by the modeler. One typical technique used here is the creation of hierarchies and conditions of greater and greater scope and abstraction, in order that a language model will be populated by an ordered range of objects from simple LEX objects, through SYN objects and PHR objects, to for example THEME objects. Finally, these language objects of various levels of abstraction, scope, or complexity may be used to build general flows (for example, safety net flows) that may be used by developers of natural language applications across a range of domains. Thus, by undertaking sequentially the activities illustrated in FIG. 14, each requiring its own tools and generally handling language objects of greater complexity, scope, and abstraction, a language modeler may build a language library suitable for use by NLI developers to rapidly build natural language applications that are capable of realistically interacting with users using natural language utterances.

Figure 15:
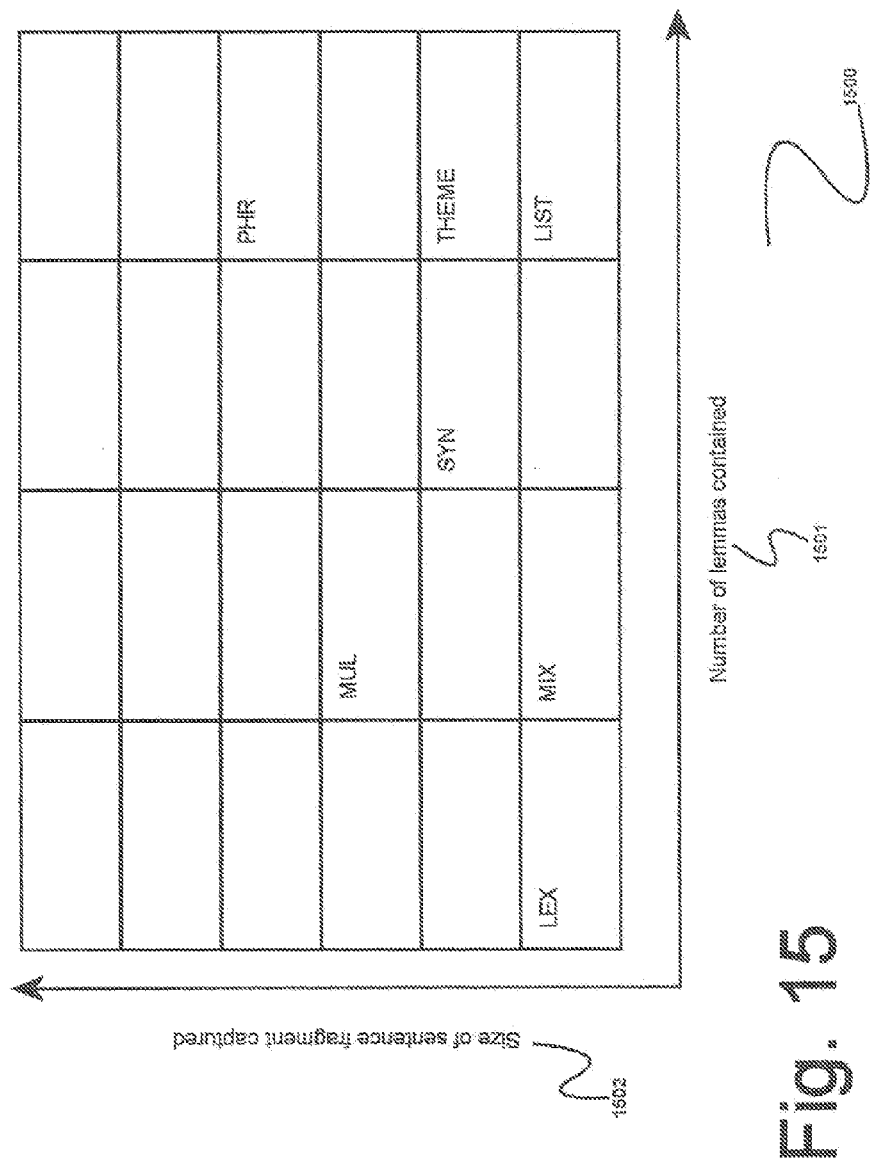
FIG. 15 is a block diagram illustrating how language object types may perform within a natural language application, according to an embodiment of the invention.

FIG. 15 is a block diagram illustrating how language object types may perform within a natural language interpretation application such as a virtual assistant, according to an embodiment of the invention. According to the embodiment, language object types 1500 positions some language object types and categorizes them based on the number of lemmas 1501 they may contain as well as based on fragment size of an input sentence 1502 that each language object type typically may intend to capture. As the size of a captured sentence fragment grows 1502, the number of lemmas contained 1501 within it typically also grows. For example: a LEX 1301 language object, as a basic building block, is at the lower end of FIG. 15 and the language object types chart 1500. As a number of LEX 1301 language objects captured increases, a sentence fragment captured grows and a MUL 1302 language element structure may be developed. Sentence fragments continue to be captured and the number of contained lemmas grows to a point where a PHR 1305 language object may be developed.

Figure 16:
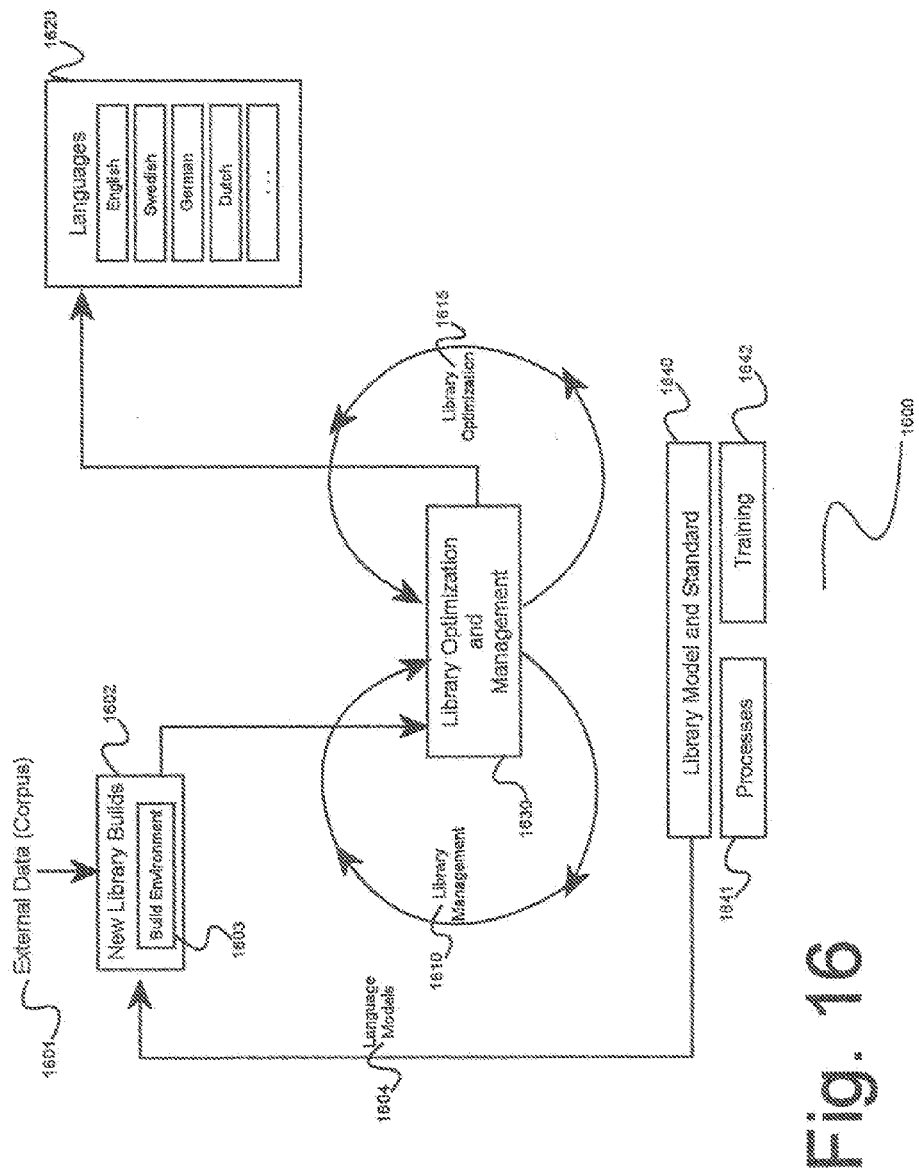
FIG. 16 is a block diagram of a system and method for library creation and optimization, according to an embodiment of the invention.

FIG. 16 is a block diagram of a system and method 1600 for library creation and optimization, according to an embodiment of the invention. According to the embodiment, library build and optimization 1600 consists of external data 1601 (corpus) being processed into usage for many languages 1620. It will be appreciated by one having ordinary skill in the art that there are any number of other written and spoken languages that could be adopted; these exemplary embodiments are not to be taken as limiting. In an embodiment, external data 1601 flows into new library builds 1602; new library builds 1602 may be created using a build toolbox 1603 of language elements. Library optimization and management 1630 represents series of processes that enable a natural language interface developer to extend and refine existing language libraries and/or to create new libraries. Importantly, library optimization 1615 may comprise a series of automated tools (described below) that identify problems (such as redundant language objects) the tools then either guiding a user in correcting them, or automatically correcting any identified deficiencies. Library management 1610 provides tools and processes for maintaining a plurality of language libraries, for example by implementing version control, consistency checking, automated regression testing, and other management functions. Language libraries are models of natural languages such as English, Spanish, Swedish, Chinese, or any other natural languages 1620, and may cover both spoken and written language. In many cases, one or more language library models or standards 1640 may be provided to assist NLI developers in creating natural language applications. These models and standards 1640 may be used, in conjunction with various library development processes 1641 (described in detail below) and language model training 1642 (also described below) to build one or more language models 1604 that may then be edited, extended, refined, or otherwise modified using build toolbox 1603 to create new library builds 1602; such editing and refining will generally incorporate into language model 1604 various external data elements 1601, for example an additional corpus 1420). Build toolbox 1602 may comprise one or more elements useful for creation and expansion of library elements, as discussed above within FIG. 13.

Figure 17:
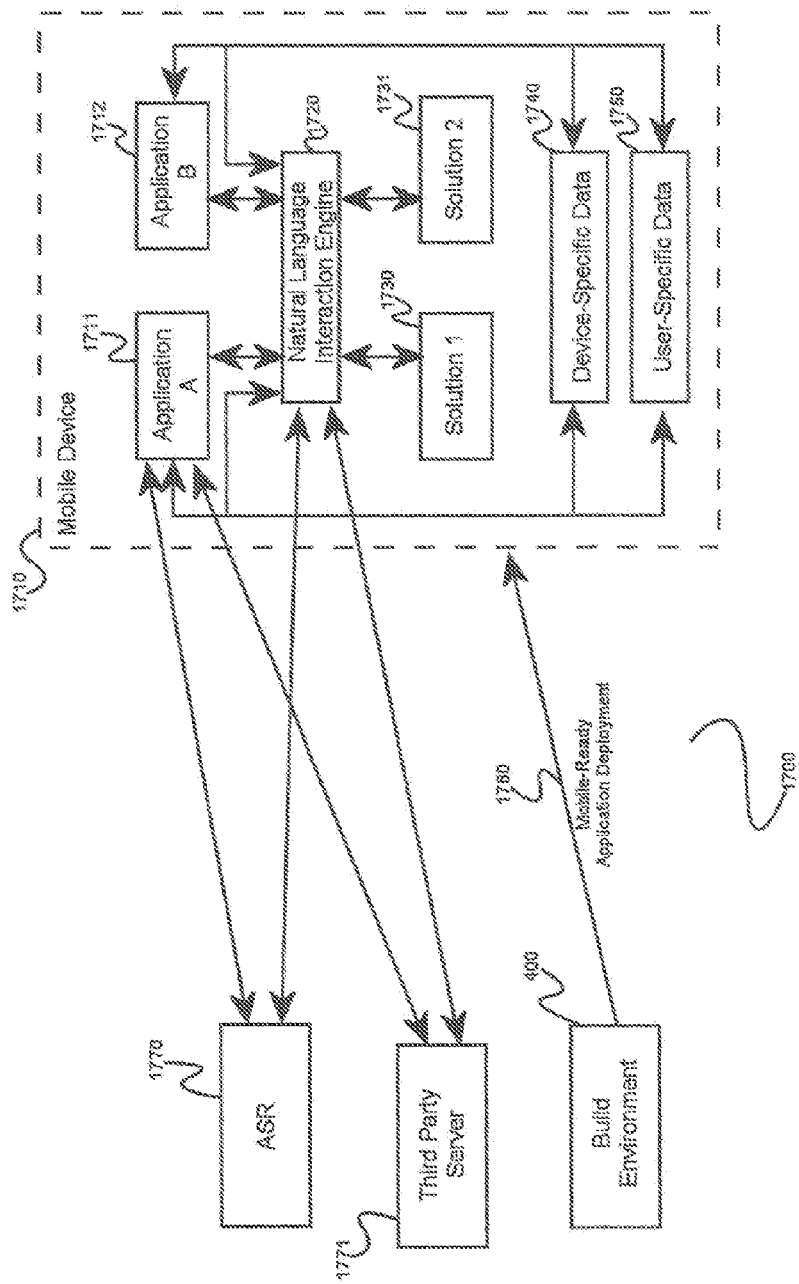
FIG. 17 is a block diagram of a system with a natural language interaction engine residing on a mobile device, according to an embodiment of the invention.

FIG. 17 is a block diagram of a system 1700 with a natural language interaction engine residing on a mobile device, according to an embodiment of the invention. According to the embodiment, a portion of the functionality of natural language interaction engine 703 and its associated components may be deployed on a mobile device 1710. In particular, natural language interaction engine 1720 may be deployed in full or in part on mobile device 1710, which is advantageous at least because, to the extent a fully functional natural language interaction engine 1720 is deployed on a mobile device 1710, one or more natural language applications 1711, 1712 may be executable on mobile device 1710 even when the device lacks network connectivity. Since most mobile devices 1710 are at least intermittently disconnected from networks, the ability to operate robust natural language applications such as application A 1711 and application B 1712 clearly represents a significant usability enhancement over those natural language applications known in the art. For example, Apple's Siri™ virtual assistant product only works when connected via a mobile telephony network to one or more servers operated by Apple, which represents a usability problem for situations where users lose network connectivity (for example, in many places users traveling in cars, trains, or planes may go for significant periods with no network connectivity, and may also experience only degraded or intermittent network connectivity when on a network). Since it is well known in the art that some types of services such as ASR 1770 may be too processor-intensive to be deployed entirely onboard mobile device 1710, natural language interaction engine 1720 may interact or utilize ASR 1770 or other third party services 1771 (such as, for example, text-to-speech, search engines, and the like) when connected to a network to augment functionality available to either application A 1711 or application B 1712 or both (of course, applications 1771 and 1772 are merely exemplary, and more or fewer applications may be deployed continuously or intermittently on mobile device 1710, according to the invention; for example, some applications may be uploaded temporarily to run on mobile device 1710 and then deleted once used until they are needed again). Of course, ASR 1770 may be deployed on a mobile device 1710 if such a device has sufficient processing power to handle a particular set of speech recognition tasks; it is anticipated that such deployments may become more and more common as the processing power available in mobile devices continues to improve. In other embodiments, some portion of ASR 1770 may be deployed on device 1710 while others remain on one or more network-connected servers. For example, simple ASR 1770 grammars might be used on-device, and unrecognized or poorly-recognized speech might be sent as needed to a server for further ASR 1770 processing.

According to the embodiment, build environment 400 may be used to develop and deploy natural language applications such as application A 1711 and application B 1712. In some embodiments, natural language interaction engine 1720 is a mobile application that is deployed from an application store or downloaded directly from a web site or other source by a user, and that interacts with one or more separate mobile applications 1711, 1712 using data from one or more solutions 1731, 1732. In other embodiments, solutions 1731 and 1732 might be loaded directly into applications 1711 and 1712, respectively. In yet other embodiments, a solution 1731 and a natural language interaction engine 1720 may be embedded fully into a standalone mobile application 1711; while in other embodiments individual solutions 1731, 1732 may be deployed either as separate mobile applications 1711, 1712 that interact with engine 1720 or as modules that are downloaded to device 1720 and installed as add-ons to engine 1720. Build environment 400 will typically comprise exemplary features described above with reference to FIG. 4. When a developer has completed and tested a natural language application such as a virtual assistant, then mobile-ready application deployment 1760 may be carried out across one or more data networks or mobile telephony networks, to deliver the resulting application to a plurality of mobile devices 1710, either on demand, as implicitly needed, or via for example the mediation of an "app store" such as are well known in the art (in which case, typically a user of mobile device 1710 would explicitly select a mobile-ready natural language application 1711, 1712 and upload it to her mobile device 1710. According to the embodiment, natural language applications need not be tightly bound in a one-to-one relationship with solutions such as solution 1 1730 and solution 2 1731. For example, solution 1 1730 might be a travel-related solution, comprising elements such as those described above with reference to item 730 in FIG. 7, and solution 2 1731 might be a credit card transaction solution. Both solution 1 1730 and solution 2 1731 may be deployed (either permanently or temporarily under user of system control) on a single mobile device 1710 (and indeed a plurality of other solutions may be as well, limited only by available resources on mobile device 1710). Continuing the example, application A 1711 might be an airline reservation application (perhaps provided by an airline itself, or by a third party application vendor), which might make use of language recognition rules and flows (among other items) from both solution 1 1730 (for travel-related flows) and solution 2 1731 (for credit card transaction related flows). Similarly, application B 1712 might be a virtual assistant application using natural language user interaction, facilitated by natural language interaction engine 1720. Such a virtual assistant application might only occasionally have need to use solution 1 1730 (for example, when the user of mobile device 1710 desires to set up a flight itinerary using virtual assistant application 1712); similarly, virtual assistant 1712 might also have occasional need for solution 2 1731 to conduct credit card transactions (whether or not related to travel). Thus it should be clear to one having ordinary skill in the art that a plurality of solutions 1730-1731 may be deployed on mobile device 1710, and that these solutions may make their capabilities available to all or a portion of a plurality of natural language applications 1711-1712 deployed on mobile device 1710. Moreover, natural language applications 1711-1712 may typically be provided with access (generally subject to application-based or user role-based security restrictions imposed by mobile device 1710) to device-specific data 1740 (such as location data, device 1710 orientation and other environmental data, map data stored on or accessible via mobile device 1710, and so forth) or user-specific data 1750 (such as a user's address, phone number, location history, preferences, or even sign-on data to various online services such as Twitter™, Facebook™, and the like). Thus FIG. 17 shows a valuable embodiment of the invention in which a user of a mobile device 1710, even when only intermittently connected to the Internet or a mobile telephony network, may enjoy rich, natural language-based applications with low latency resulting from their residence on the mobile device 1710 itself (while still being able to invoke or utilize any number of network-resident services such as ASR 1770 and other third-party services or servers 1771).

The skilled person will be aware of a range of possible modifications of the various embodiments described above. Accordingly, the present invention is defined by the claims and their equivalents.

What is claimed is:

1. A system for delivering advanced natural language applications, the system comprising:
    a dialog interface module operating on a server computer and adapted for exchanging information with a user via a network;
    a natural language interaction engine operating on a server computer and coupled to the dialog interface module, for interpreting a received user request;
    a solution data repository component operating on a server computer and coupled to the natural language interaction engine, the solution data repository comprising a plurality of hierarchical ontological domain models, a plurality of hierarchical language models comprising a preconfigured, hierarchical arrangement of language objects, a plurality of language recognition rules expressed in terms of elements of the plurality of hierarchical language models, and a plurality of flow elements and rules for managing interactions with users; and
    an interface software module coupled to the natural language interaction engine and adapted to exchange data or commands with a plurality of external software services over a network;
    wherein upon receipt of a request from a user via a network, the dialog interface module preprocesses the request and transmits it to the natural language interaction engine; and
    wherein the natural language interaction engine interprets the request to determine one or more semantic meanings or user intents associated with the request, using the plurality of language recognition rules, the plurality of hierarchical ontological domain models, and the plurality of flow elements stored in the solution data repository; and
    further wherein, based at least on the one or more semantic meanings or user intents, the natural language interaction engine forms an appropriate response and delivers the response to the dialog module, which uses one or more output means of the computing device to provide a response to the user via a network, or takes an appropriate automated action in response to the request.

2. A method for delivering advanced natural language interaction applications, the method comprising the steps of:
    (a) receiving a request from a user at a dialog interface module;
    (b) pre-processing the request by the dialog interface module;
    (c) transmitting the request in an appropriate form to a natural language interaction engine;
    (d) evaluating the request using a plurality of hierarchical language models, a plurality of language recognition rules expressed in terms of elements of the plurality of hierarchical language models comprising a preconfigured, hierarchical arrangement of language objects, a plurality of hierarchical ontological domain models, and a plurality of flow elements stored in the solution data repository until either a determination is made that additional input is needed from the user or that no further conditions exist;
    (e) sending an appropriate response to the user or taking an appropriate action based at least on the results of step (d); and
    (f) awaiting a further user request or a session end event.

3. An automated assistant operating on a computing device, the assistant comprising:
    a dialog interface module operating on the computing device and adapted for exchanging information with a user using one of a plurality of input and output means of the computing device;
    a natural language interaction engine coupled to the dialog interface module, for interpreting a received user request;
    a solution data repository component, comprising a plurality of hierarchical ontological domain models, a plurality of hierarchical language models comprising a preconfigured, hierarchical arrangement of language objects, a plurality of language recognition rules expressed in terms of elements of the plurality of hierarchical language models, and a plurality of flow elements and rules for managing interactions with users; and
    an interface software module coupled to the natural language interaction engine and adapted to exchange data or commands with a plurality of external software services over a network;
    wherein upon receipt of a request from a user via an input means of the computing device, the dialog interface module preprocesses the request and transmits it to the natural language interaction engine; and
    wherein the natural language interaction engine interprets the request using a plurality of hierarchical language models comprising a preconfigured, hierarchical arrangement of language objects, a plurality of language recognition rules expressed in terms of elements of the plurality of hierarchical language models, a plurality of hierarchical ontological domain models, and a plurality of flow elements stored in the solution data repository until either a determination is made that additional input is needed from the user or that no further conditions exist; and
    further wherein, based at least on the one or more semantic meanings or user intents, the natural language interaction engine forms an appropriate response and delivers the response to the dialog module, which uses one or more output means of the computing device to provide a response to the user, or takes an appropriate automated action based on the request.

* * * * *